United States Patent
Patil et al.

(10) Patent No.: US 11,157,917 B2
(45) Date of Patent: *Oct. 26, 2021

(54) SELF-SERVICE PRODUCT RETURN USING COMPUTER VISION AND ARTIFICIAL INTELLIGENCE

(71) Applicant: ShopperTrak RCT Corporation, Chicago, IL (US)

(72) Inventors: Amit R. Patil, Naperville, IL (US); Michael Paolella, Lake Zurich, IL (US); Michelangelo Palella, Bartlett, IL (US); Steve E. Trivelpiece, Rancho Santa Margarita, CA (US); Channing E. Miller, Fort Lauderdale, FL (US); Zafar Mohammad Haq, Arlington Heights, IL (US); Kelly Surles, Chicago, IL (US); Manan Kothari, Chicago, IL (US); Kevin Weithers, Chicago, IL (US)

(73) Assignee: SHOPPERTRAK RCT CORPORATION, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,903

(22) Filed: Jan. 9, 2020

(65) Prior Publication Data

US 2020/0151735 A1    May 14, 2020

Related U.S. Application Data

(63) Continuation-in-part of application No. 16/107,175, filed on Aug. 21, 2018, now Pat. No. 10,846,678.

(Continued)

(51) Int. Cl.
*G06K 15/00*    (2006.01)
*G06Q 30/00*    (2012.01)
(Continued)

(52) U.S. Cl.
CPC .......... *G06Q 30/016* (2013.01); *G06N 20/00* (2019.01); *G06Q 30/012* (2013.01);
(Continued)

(58) Field of Classification Search
CPC .............. G06Q 30/016; G06Q 30/012; G06Q 30/0185; G06Q 30/0212; G06N 20/00; G06T 7/0004; G06T 2207/30108
(Continued)

(56) References Cited

U.S. PATENT DOCUMENTS

2004/0193438 A1    9/2004   Stashluk et al.
2004/0194056 A1    9/2004   Combs et al.
(Continued)

OTHER PUBLICATIONS

International Search Report and Written Opinion issued for PCT/US2021/012372 dated Mar. 2, 2021.

*Primary Examiner* — Thien M Le
(74) *Attorney, Agent, or Firm* — Arent Fox LLP

(57) ABSTRACT

Systems and methods for returning an item. The methods comprise: performing operations by a self-return station to capture an image of a first item that an individual is trying to return to an entity; performing machine learning operations by the self-return station using the image to determine whether the first item is damaged and to determine a degree of item damage; allowing, by the self-return station, a return of the first item to the entity when the first item is not damaged or when the degree of item damage does not exceed a threshold value; and preventing, by the self-return station, the return of the first item to the entity when the first item is damaged and the degree of item damage exceeds the threshold value.

18 Claims, 22 Drawing Sheets

Related U.S. Application Data

(60) Provisional application No. 62/790,463, filed on Jan. 9, 2019.

(51) Int. Cl.
 *G06T 7/00* (2017.01)
 *G06Q 30/02* (2012.01)
 *G06N 20/00* (2019.01)

(52) U.S. Cl.
 CPC ..... *G06Q 30/0185* (2013.01); *G06Q 30/0212* (2013.01); *G06T 7/0004* (2013.01); *G06T 2207/30108* (2013.01)

(58) Field of Classification Search
 USPC ........................................ 235/383, 380, 379
 See application file for complete search history.

(56) References Cited

U.S. PATENT DOCUMENTS

| | | |
|---|---|---|
| 2004/0245334 A1 | 12/2004 | Sikorski |
| 2014/0333761 A1 | 11/2014 | Porter |
| 2019/0080277 A1 | 3/2019 | Trivelpiece et al. |
| 2019/0287055 A1 | 9/2019 | Wicks et al. |

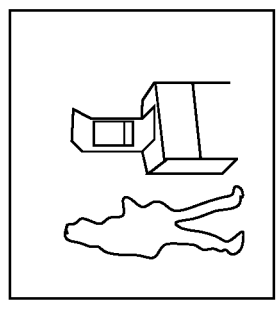
FIG. 12A Customer Enters
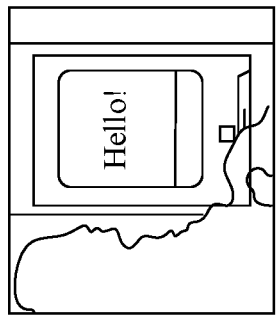
FIG. 12B Begin Return
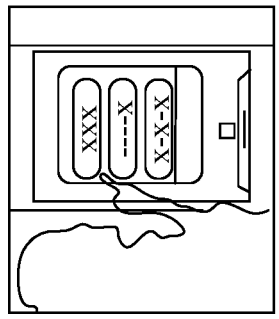
FIG. 12C Select Process
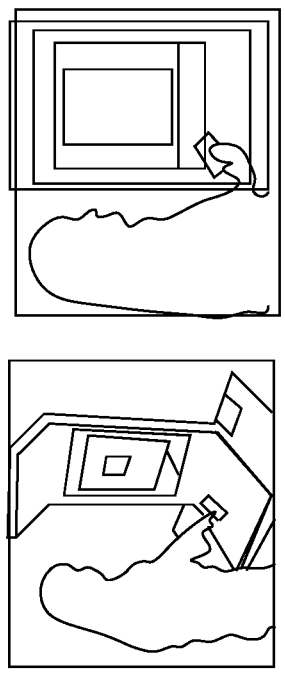
FIG. 12D Receipt Scan
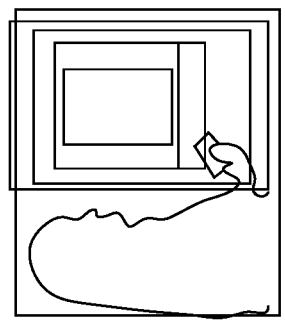
FIG. 12E Verification
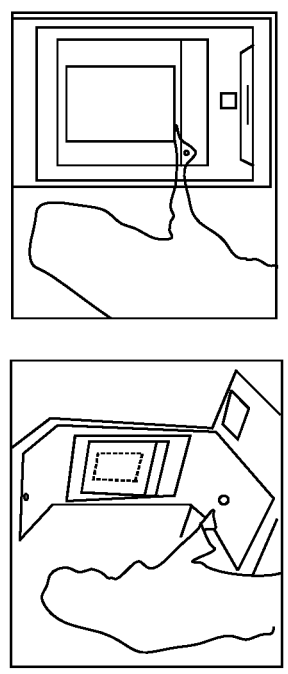
FIG. 12F Item Scan
FIG. 12G Item Select
FIG. 12H Return Item
FIG. 12I Credit Card Scan
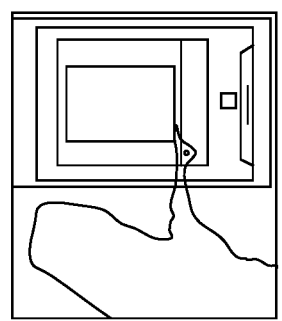
FIG. 12J Finish

SELF-SERVICE PRODUCT RETURN USING COMPUTER VISION AND ARTIFICIAL INTELLIGENCE

CROSS-REFERENCE TO RELATED APPLICATIONS

The present application is a Continuation-In-Part of U.S. Non-Provisional patent application Ser. No. 16/107,175 which was filed on Aug. 21, 2018, and claims priority to U.S. Provisional Patent Application Ser. No. 62/790,463 which was filed on Jan. 9, 2019. The contents of these Patent Applications are incorporated herein it their entirety.

BACKGROUND

Statement of the Technical Field

The present disclosure relates generally to computing systems. More particularly, the present disclosure relates to implementing systems and methods for self-service product return using computer vision and Artificial Intelligence ("AI").

Description of the Related Art

Today when you want to return an item to a retail store you need to find the receipt, take the item to the store, stand in a long line, and then explain why you are returning the product. This is a slow and inefficient process. It costs the store a lot of money to have an employee assist in the return process. In addition, the process does not have much security and thieves return products that are damaged or that they did not pay for. Some companies have implemented ideas like Quick Response ("QR") codes to help speed up the process. However, this process is still expensive since an employee is still needed to assist in the return process.

SUMMARY

The present disclosure concerns implementing systems and methods for returning an item. The methods comprise: performing operations by a self-return station to capture an image of a first item that an individual is trying to return to an entity; performing machine learning operations by the self-return station using the image to determine whether the first item is damaged and to determine a degree of item damage; allowing, by the self-return station, a return of the first item to the entity when the first item is not damaged or when the degree of item damage does not exceed a threshold value; preventing, by the self-return station, the return of the first item to the entity when the first item is damaged and the degree of item damage exceeds the threshold value; and/or performing operations by the self-return station to (1) allow the return of the first item to the entity and (2) cause the first item to be quarantined, when the first item is damaged and the degree of item damage does not exceed the threshold value.

In some scenarios, the methods also comprise: obtaining, by the self-return station, first information identifying the individual or second information identifying a customer account associated with the individual; using, by the self-return station, the first or second information to access third information specifying at least one of a total number of returned items for a given time period and a total dollar amount for the returned items; rejecting, by the self-return station, the return of the first item to the entity when the total number of returned items or the total dollar amount exceeds a threshold value; and/or accepting, by the self-return station, the return of the first item to the entity when the total number of returned items or the total dollar amount does not exceed the threshold value.

In those or other scenarios, the methods comprise: receiving by the self-return station a reason why the individual is trying to return the first item to the entity; performing operations by the self-return station to cause an advertisement, coupon, or replacement item information to be selected based on the reason; and/or performing operations by the self-return station to present the advertisement, coupon, or replacement item information to the individual.

In those or other scenarios, the methods comprise: receiving by the self-return station a user input for locating a second item in a facility; detecting by the self-return station an image placed in proximity to the self-return station; obtaining identification information from the image that identifies a second item that is associated with the image; using the identification information to determine a location of the second item within a facility or a location of a third item within the facility that is similar to the second item; and/or causing the location to be presented to the individual.

BRIEF DESCRIPTION OF THE DRAWINGS

The present solution will be described with reference to the following drawing figures, in which like numerals represent like items throughout the figures.

FIG. 7 provides a front view of the illustrative architecture for the return station. FIG. 8 provides a top view of the illustrative architecture for the return station. FIG. 9 provides a side view of the illustrative architecture for the return station. FIG. 10 provides a rear or back view of the illustrative architecture for the return station.

FIGS. 12A-12J (collectively referred to as "FIG. 12") provide illustrations showing how an item return process may be performed using a return station comprising a kiosk, such as that shown in FIGS. 3-4 and/or 5-10.

DETAILED DESCRIPTION

Figure 1:
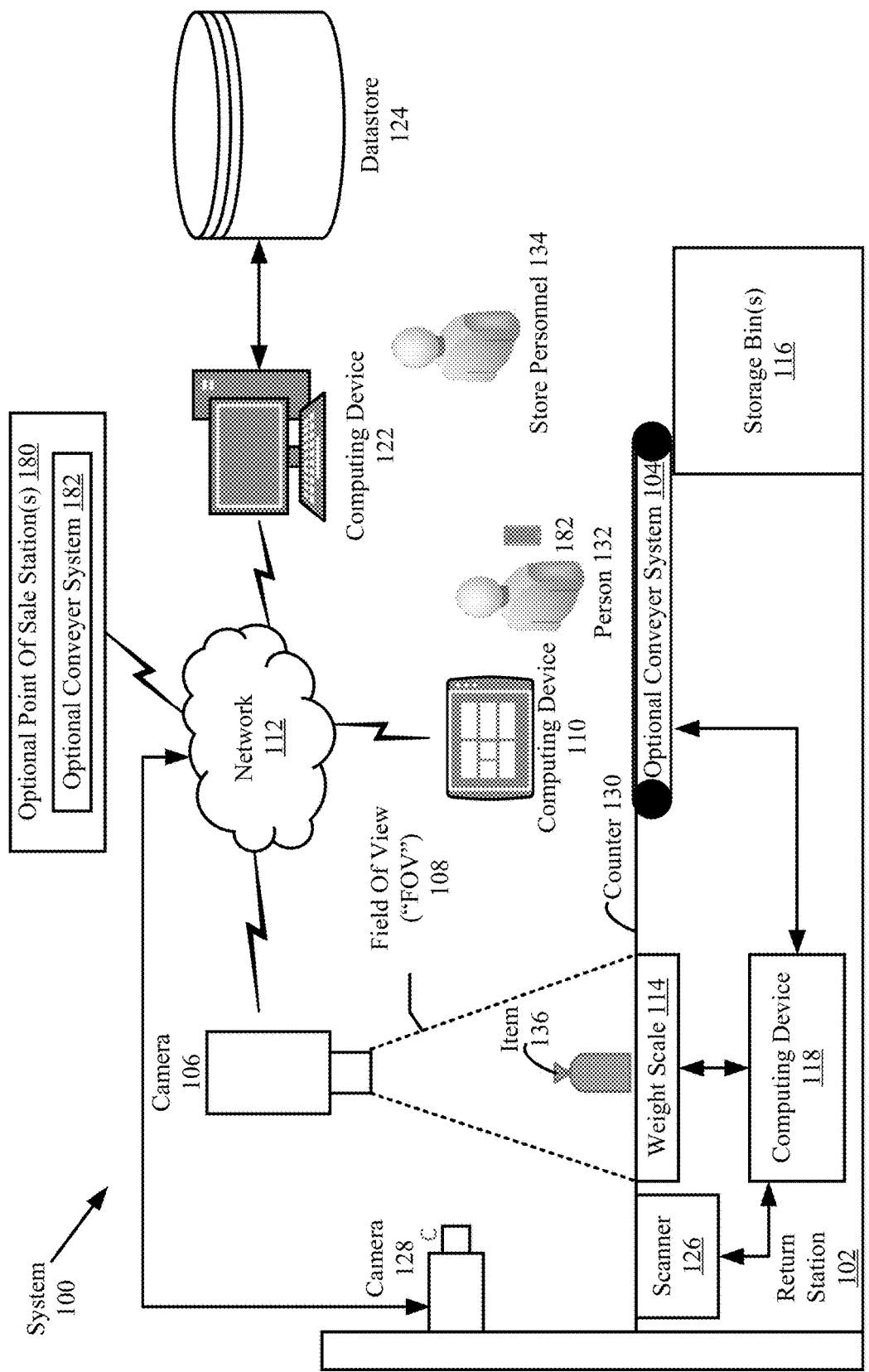
FIG. 1 provides an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In retail stores, there is a need for a way to return purchased items without a requirement for store employee assistance. Accordingly, the present solution provides an automated way for items to be returned to retail stores or other business entities (e.g., libraries). Multiple systems are used to speed up the return process and to verify the authenticity and quality of the returned products. These systems comprise cameras. Cameras have improved in quality and price over the years. In addition, AI and machine learning allow cameras to: identify a person, receipt, and/or credit card; determine the state or condition of a product being returned; and/or determine the authenticity of the product being returned. Furthermore, the cost of storing data associated with past purchases and about the sold products allow companies to store data that can be used to verify the validity of the return products.

The present solution will now be described in relation to the return of purchased items. The present solution is not limited in this regard. The present solution can also be used in loaned or borrowed item applications.

Referring now to FIG. 1, there is provided an illustration of an illustrative system 100. System 100 is generally configured to facilitate the purchase of items and/or the return of purchased items 136. The items include perishable items (e.g., food) and/or non-perishable items (e.g., apparel, appliances, automotive parts, beauty supplies, personal care items, books, consumer electronics, entertainment tickets, fashion accessories, footwear, office supplies, sports equipment, toys, video games, watches, glasses and/or jewelry).

As shown in FIG. 1, system 100 comprises one or more optional Point Of Sale ("POS") stations 180. POS stations are well known in the art, and therefore will not be described herein. Any known or to be known POS station can be used herein without limitation. The POS station includes a fixed POS station (e.g., a traditional checkout counter), a self-checkout kiosk, or a mobile POS (e.g., a smart phone). The POS station(s) 180 is(are) generally configured to facilitate the initiation of a purchase transaction and the completion of the same. In some scenarios, a conventional POS station is modified to implement machine learning technology. For example, hardware and/or software is provided with a POS station that is configured to learn features/characteristics of a purchaser, learn patterns of movement of the purchaser, and/or learn features/characteristics/conditions of a purchased item. The learned information is stored in a datastore 124 for later use in an item return process. Datastore 124 can include, but is not limited to, a database.

System 100 also comprises a return station 102, cameras 106, 128, and computing devices 110, 122 communicatively coupled to each other via a network 112 (e.g., the Internet). The return station 102 is also referred to herein as a self-return station. Cameras are well known in the art, and therefore will not be described herein. Any known or to be known camera can be used herein without limitation. For example, in some scenarios, 3D cameras are employed. The cameras are generally configured to capture images and/or videos of scenes in their Field Of Views ("FOVs"). The term "Field Of View" or "FOV", as used herein, refers to the extent of the observable world that is captured at any given moment by a camera. Each FOV has a value less than or equal to one hundred eighty degrees (180°).

Camera 128 is placed at a location relative to the return station 102 that is suitable for capturing images and/or videos of people 132 trying to return items 136. Camera 128 is provided to assist in verifying that the same person who purchased the item is the same person who is returning the item. In this regard, the camera 128 employs algorithms to identify a person in its FOV and extract features of the identified person. The extracted features are compared against features shown in an image captured at the time of a respective purchase transaction performed by the POS station 180. If a match exists, then a verification is made that the person is the same person who purchased the item. If a match does not exist, then a flag can be set and/or store personnel can be notified. Additionally or alternatively, the image of the different person captured at the time of return can be stored in a datastore 124 so as to be associated with a user account, the respective purchase transaction and/or the item return attempt.

Camera 106 is positioned above the return station 102 so that at least a portion of a counter 130 is in its FOV 108. Camera 106 is provided to assist in identifying items being returned and/or in determining the conditions of the items being returned. In this regard, the camera 106 employs algorithms to determine what the item(s) is(are) on the counter 130 (and in some scenarios on the weight scale 114 which is optional). For example, the camera 106 is able to identify an object in an image captured thereby, determine characteristics of the object (e.g., color, size, shape, etc.), and determine a condition of the object (e.g., damaged or resalable). The characteristics are then compared against a database of object-related data to determine if a match or a similarity exits therebetween. If a match or similarity exits, then the object unique identifier associated with the matching or similar stored object-related data is allocated to the image. The condition is also compared against a condition for the item shown in an image captured at the time of its purchase. If a match does not exist, then a flag can be set that the item may not be resalable or was not sold in a damaged state as suggested by the person returning the item. Store personnel could be notified in either case.

Computing device 110 comprises a mobile computing device, such as a tablet, personal computer or smart phone. Computing device 110 is used by a person 132 to initiate an item return process, input information into system 100 during the item return process, and complete the item return process. Accordingly, computing device 110 wirelessly communicates with an enterprise system 122, 124 via the network 112 for accessing purchase transaction information generated by the POS station 180 and notifying store personnel 134 of the item return process's status. The enterprise system comprises a computing device 122 (e.g., a server) and a datastore 124. The purchase transaction information includes, but is not limited to, identifiers for purchased items, dates/times of successful purchases, payment information, biometric data for the people who made the purchases, voices of the people who made the purchases, images of people who made the purchases, and/or videos of the purchase transaction. The particulars of the item return process will become more evident as the discussion progresses.

The return station 102 comprises a counter 130, a scanner 126, a weight scale 114 and a conveyer system 104 disposed therein so as to be accessible for use during the item return process. The scanner 126 is shown as being provided with the counter 130. The present solution is not limited in this regard. The scanner 126 can be located along with camera 106 or 128. In some scenarios, the scanner 126 is at least partially implemented by camera 106 or 128. The scanner can include, but is not limited to, a barcode scanner, an RFID tag scanner, or other Short Range Communication ("SRC") enabled device (e.g., a Bluetooth enabled device). The scanner is provided to acquire at least one code from the item 136 being returned. The code can include, but is not limited to, a Stock Keeping Unit ("SKU") and/or a Unique Product Code ("UPC"). SKUs and UPCs are well known in the art, and therefore will not be described herein. The weight scale 114 is configured to measure the weight of an item 136 placed thereon. Barcode scanners, RFID tag scanners, and weight scales are well known in the art, and therefore will not be described herein. Any known or to be known barcode scanner, RFID tag scanner, and/or weight scale can be used herein without limitation. Information generated by or obtained by components 114, 126 is provided to a computing device 118 internal to the return station 102. Computing device 118 is communicatively coupled to computing device 110 and the enterprise system 122, 124 as well via network (although not shown in FIG. 1). Therefore, the information generated by or obtained by components 114, 126 can be provided from computing device 118 to computing device 110, 122 for processing.

Computing device 118 is also configured to control operations of the scanner 126, weight scale 114 and/or the conveyer system 104. Conveyer systems are well known in the art, and therefore will not be described in detail herein. Still, it should be understood that the conveyer system 104 comprises mechanical handling equipment for moving items from the return counter 118 to storage bin(s) 116. With the assistance of computing device 118, the items are directed to respective ones of the storage bins 116 based on their product type. For example, a book is directed to a first storage bin, while shampoo is directed to a second different storage bin. The storage bin(s) 116 provide(s) a means for storing return items until the store employee 134 is ready to replace them on a store floor for resale. This ability to automatively organize returned items by type greatly improves a subsequent process for placing returned items back on a store floor. In this regard, it should be understood that in conventional systems returned items are typically placed in a single bin at the return station. As such, prior to replacement of the same on a store floor, store personal must sort the items in accordance with a store floor layout (e.g., all toiletry items are sorted into a first pile, while home goods are sorted into a second pile) and/or conditions of the same (e.g., damaged items are sorted into a third pile). In contrast, no such manual storing is required by the present solution. Accordingly, the present solution provides a more cost effective and efficient process for placing returned item back in a store floor.

The present solution employs machine learning techniques for various purposes. The machine learning techniques can be implemented by the POS station(s) 180, return station(s) 102 and/or computing devices 110, 118, 122. For example, a machine learning algorithm is used to learn features and characteristics of counterfeit items and/or items being returned. Images of the real or original items captured by a camera at a checkout POS station 180 and images of the fake or counterfeit items captured by camera 106 at the return station 102 can be used here to detect and learn features and/or characteristics thereof which are not consistent with those of the corresponding original or real non-counterfeit item. The features and/or characteristics can include, but are not limited to, stitching, label placement, label orientation, coloration, texturing, material, and misspelling of brand names. Detection of fake or counterfeit items has traditionally been quite difficult and required the assistance of experts. The machine learning aspect of the present solution provides an improved item return process since (A) it eliminates the need for experts while still ensuring that counterfeit items will not be accepted for return (as has been the case in some scenarios when store personnel manually handles item returns) and (B) continuously learns new features of counterfeit items so as to ensure real time updates are made in system 100 for learned counterfeit item features/characteristics. Machine learning algorithms are well known in the art, and therefore will not be described herein. Any known or to be known machine learning algorithm can be used herein without limitation. For example, supervised machine learning algorithm(s), unsupervised machine learning algorithm(s) and/or semi-supervised machine learning algorithm(s) are employed by system 100.

The present solution is not limited to the architecture shown in FIG. 1. In this regard, it should be understood that system 100 can include more or less components than that shown in FIG. 1. For example, in some scenarios, system 100 also comprises a printer for generating paper receipts.

Figure 2:
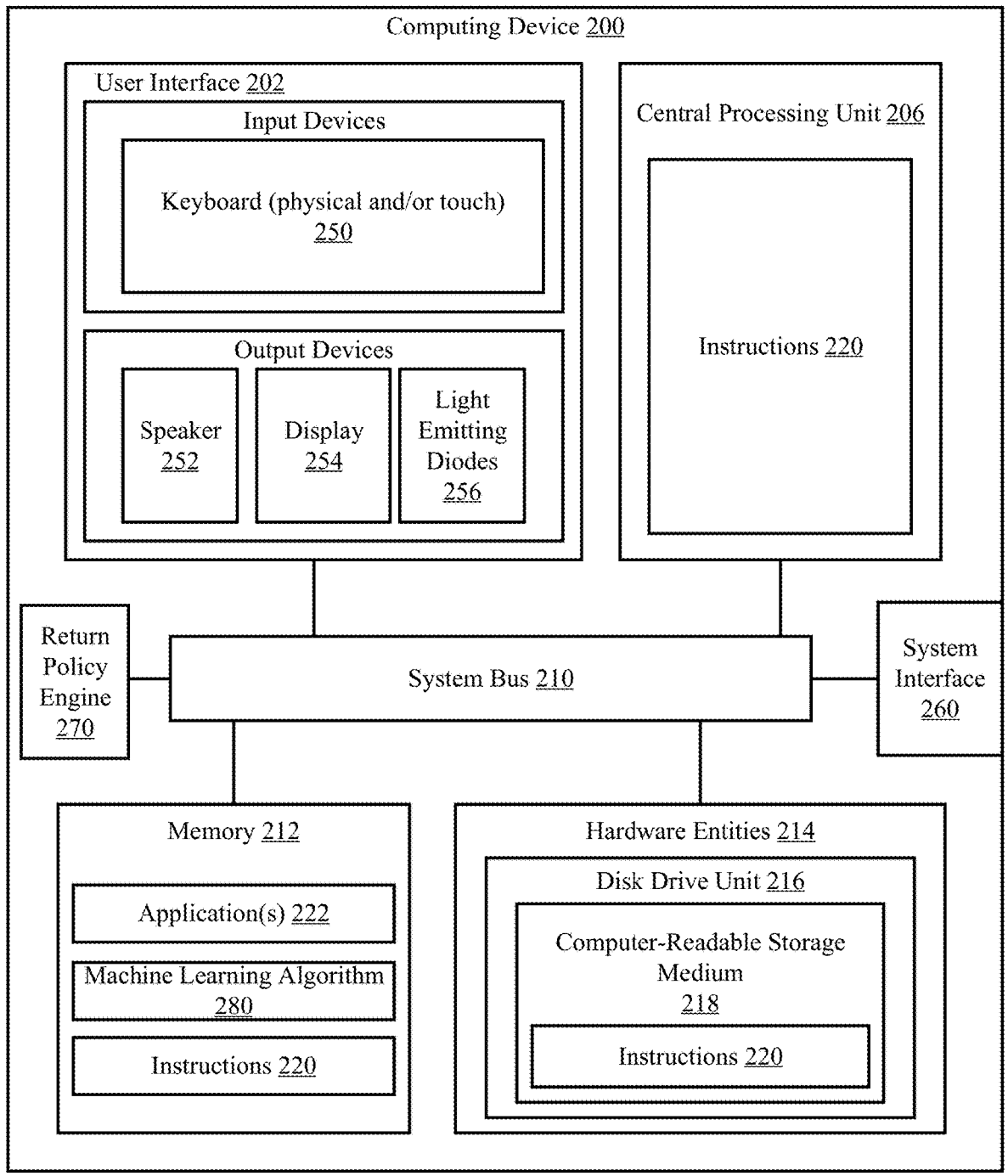
FIG. 2 provides an illustration of an illustrative computing device.

Referring now to FIG. 2, there is provided an illustration of an illustrative architecture for a computing device 200. Computing device 110, 118, 122 of FIG. 1 is(are) the same as or similar to computing device 200. As such, the discussion of computing device 200 is sufficient for understanding this component of system 100.

In some scenarios, the present solution is used in a client-server architecture. Accordingly, the computing device architecture shown in FIG. 2 is sufficient for understanding the particulars of client computing devices and servers.

Computing device 200 may include more or less components than those shown in FIG. 2. However, the components shown are sufficient to disclose an illustrative solution implementing the present solution. The hardware architecture of FIG. 2 represents one implementation of a representative computing device configured to provide an improved item return process, as described herein. As such, the computing device 200 of FIG. 2 implements at least a portion of the method(s) described herein.

Some or all components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 300 through system bus 210, a system interface 260, and hardware entities 214 connected to system bus 210. The user interface can include input devices and output devices, which facilitate user-software interactions for controlling operations of the computing device 200. The input devices include, but are not limited, a physical and/or touch keyboard 250. The input devices can be connected to the computing device 200 via a wired or wireless connection (e.g., a Bluetooth® connection). The output devices include, but are not limited to, a speaker 252, a display 254, and/or light emitting diodes 256. System interface 260 is configured to facilitate wired or wireless communications to and from external devices (e.g., network nodes such as access points, etc.).

At least some of the hardware entities 214 perform actions involving access to and use of memory 212, which can be a Radom Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

Computing device 200 implements machine learning technology. In this regard, computing device 200 runs one or more software applications 222 for facilitating the return of items. The software algorithms 222 use machine learning algorithms 280 to learn characteristics of people associated with purchase transactions and/or credit cards used for payment during the purchase transactions, learn conditions of items at the time of purchase, learn characteristics of original real non-counterfeit items, learn characteristics or traits of counterfeit items, learn characteristic of times at the time of return, and/or learn suspicious conduct indicating that a person is trying to return items which have not been purchased or which are counterfeit. This learned information can be used for various purposes as described herein. For example, an image of a person returning an item can be captured and processed to extract features of the person. The extracted features are compared to learned features of a person associated with the purchase transaction for the item and/or credit card used to purchase the item. The learned features were obtained using sensor data obtained during the purchase transaction (e.g., captured images). Alternatively or additionally, the authenticity of an item being returned can be determined based on the learned characteristics of original real non-counterfeit items and/or the learned characteristics or traits of counterfeit items. Also, return abuses (e.g., free renting) are detected using learned conditions of an item at the time of purchase and at the time of return. The present solution is not limited to the particulars of this example.

Figure 3:
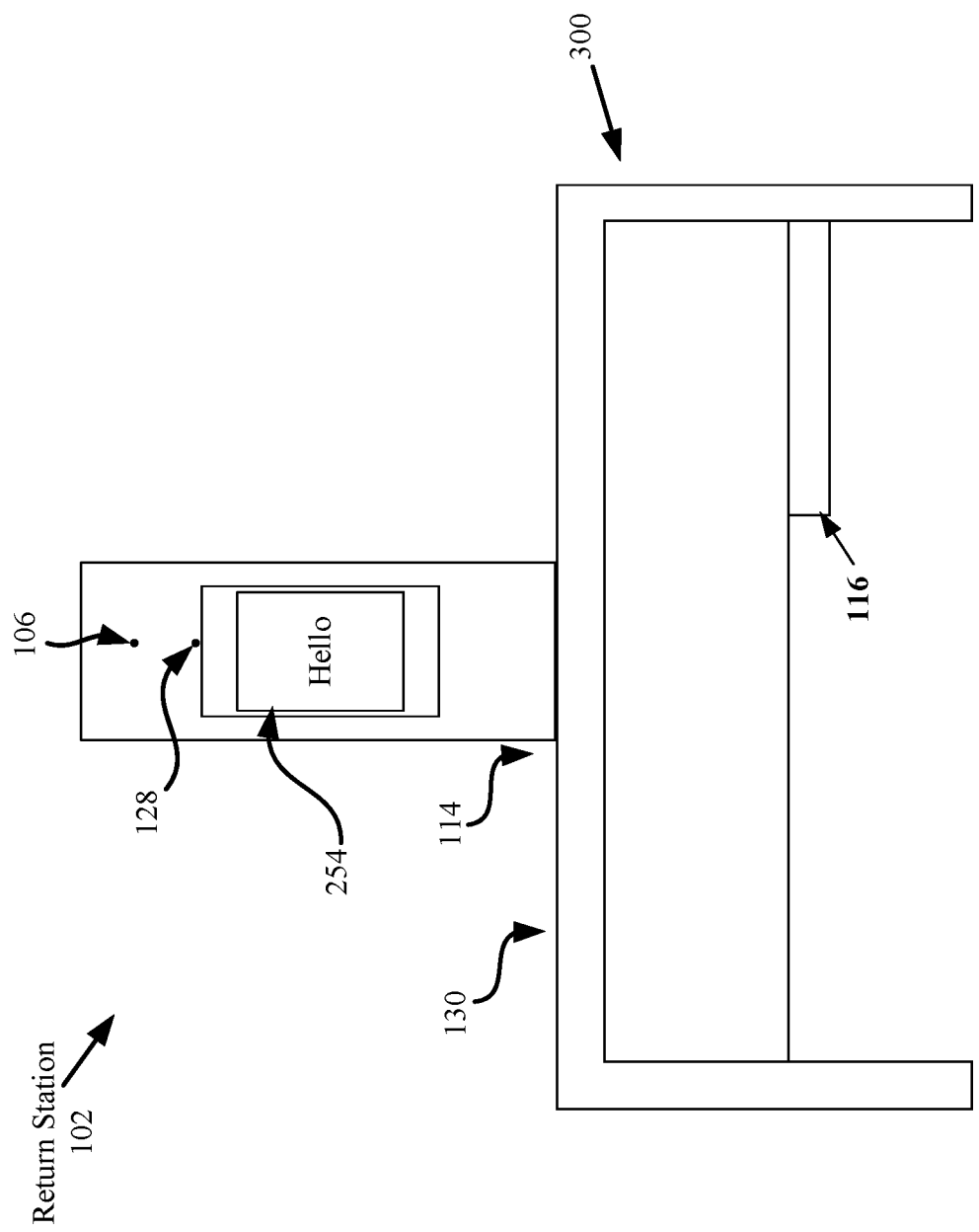
FIGS. 3-4 provides illustrations showing an illustrative architecture for a return station shown in FIG. 1. More specifically, FIG. 3 provides a front view of the illustrative architecture for the return station shown in FIG. 1, and FIG. 4 provides a partial perspective view of the illustrative architecture for the return station shown in FIG. 1.
Figure 4:
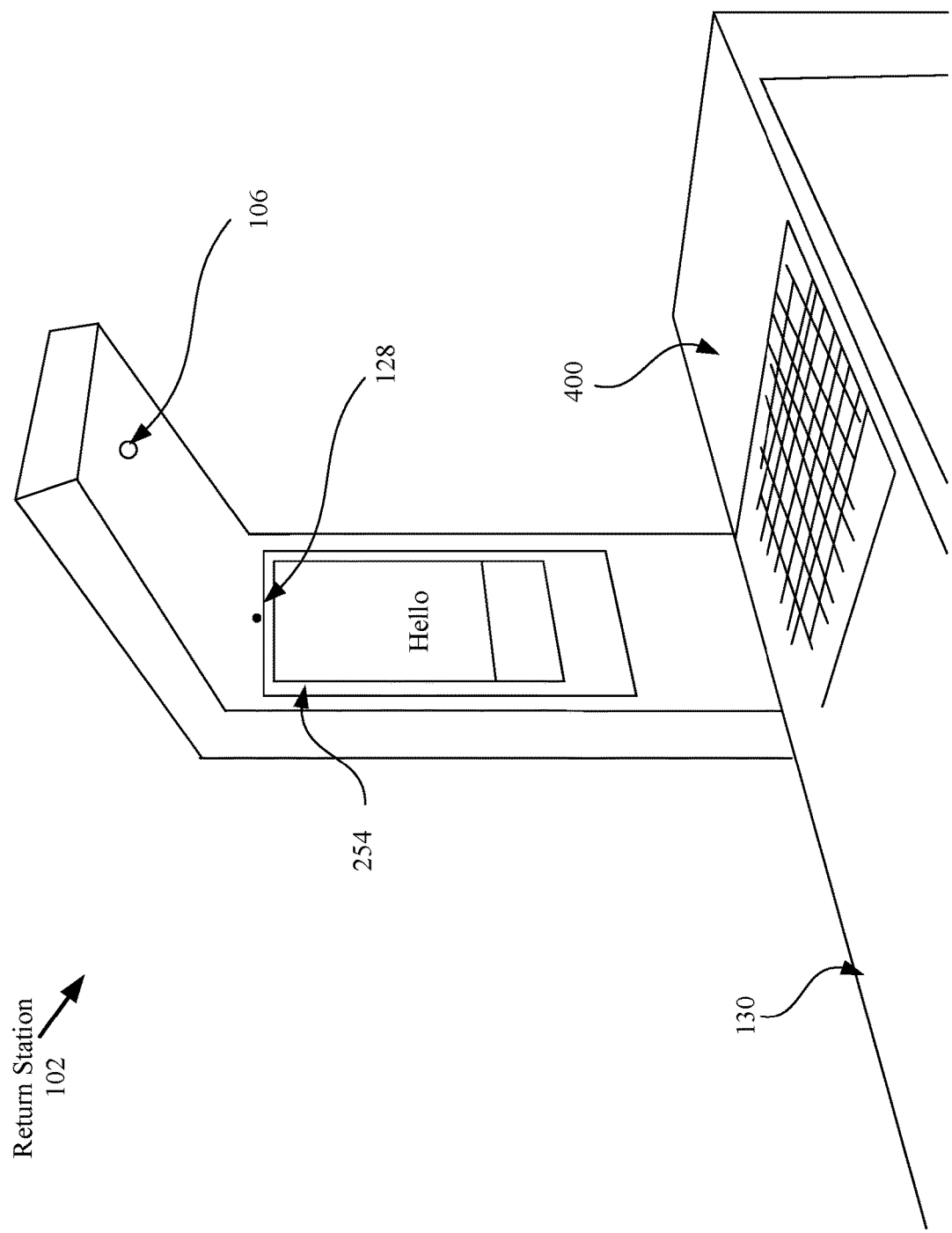
Figure 6:
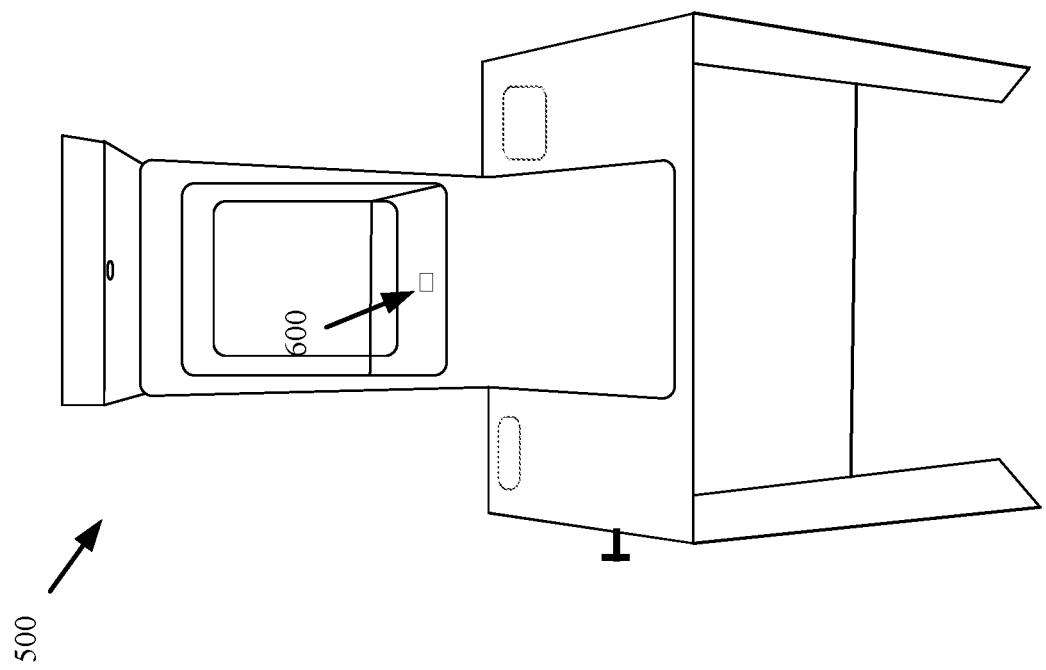
FIGS. 5-10 provide illustrations showing another illustrative architecture for a return station. More specifically, FIGS. 5-6 each provide a perspective view of the illustrative architecture for the return station.

Referring now to FIGS. 3-4, there are provided illustrations of an illustrative architecture for the return station 102 of FIG. 1. As shown in FIGS. 3-4, the return station 102 may take the form of a kiosk. In this regard, the return station 102 comprises a housing 300 in which the computing device 118, scanner 126, weight scale 114, optional conveyer system 104, cameras 106, 128, and/or storage bin(s) 116 is/are disposed. An item receipt aperture 400 is provided for allowing an individual to place the item within the return station 102. A trap door (not visible in FIGS. 3-4) may be provided for selectively preventing items from being placed into the returns station 102 via the item receipt aperture 400. Trap doors and techniques for opening/controlling trap doors are well known in the art, and therefore will not be described herein. Any known or to be known trap door technology can be used herein in accordance with a given application. In some scenarios, the trap door is normally in a closed position in which items cannot be inserted into the return station 102. The trap door is transitioned to an open position when the item's return has been accepted by the return station 102. A sensor (e.g., a beam break sensor) (not visible in FIGS. 3-4) can be placed inside the return station 102 to detect when an item has passed through the item receipt aperture 400. The trap door can be transitioned back to its closed position in response to such detection. The conveyer system 104 or storage bin(s) 116 is(are) located under the item receipt aperture 400.

The present solution is not limited to the particular architecture shown in FIGS. 3-4. An alternative illustrative architecture for a return station is provided in FIGS. 5-10. As shown in FIGS. 5-10, the alternative architecture 500 comprises a housing 502 in which a hi-definition camera 504, a touch screen display 506, a two or three dimensional camera 600, a receipt printer 508, and a bin (not visible in FIGS. 5-10) are disposed. An accessory hanger 510 is also provided at one or more locations on the housing.

Referring now to FIG. 11, there is provided a flow diagram of an illustrative method 1100 for returning an item which had been purchased using a POS station (e.g., POS station 180 of FIG. 1). As shown in FIG. 11, method 1100 comprises a plurality of operations 1101-1184. Method 1100 can include more or less operations than that shown in accordance with a given application. Also, the present solution is not limited to the particular order of the operations shown in FIG. 11. In this regard, it should be understood that some or all of the operations can be performed in the same or different order than that shown.

Figure 11A:
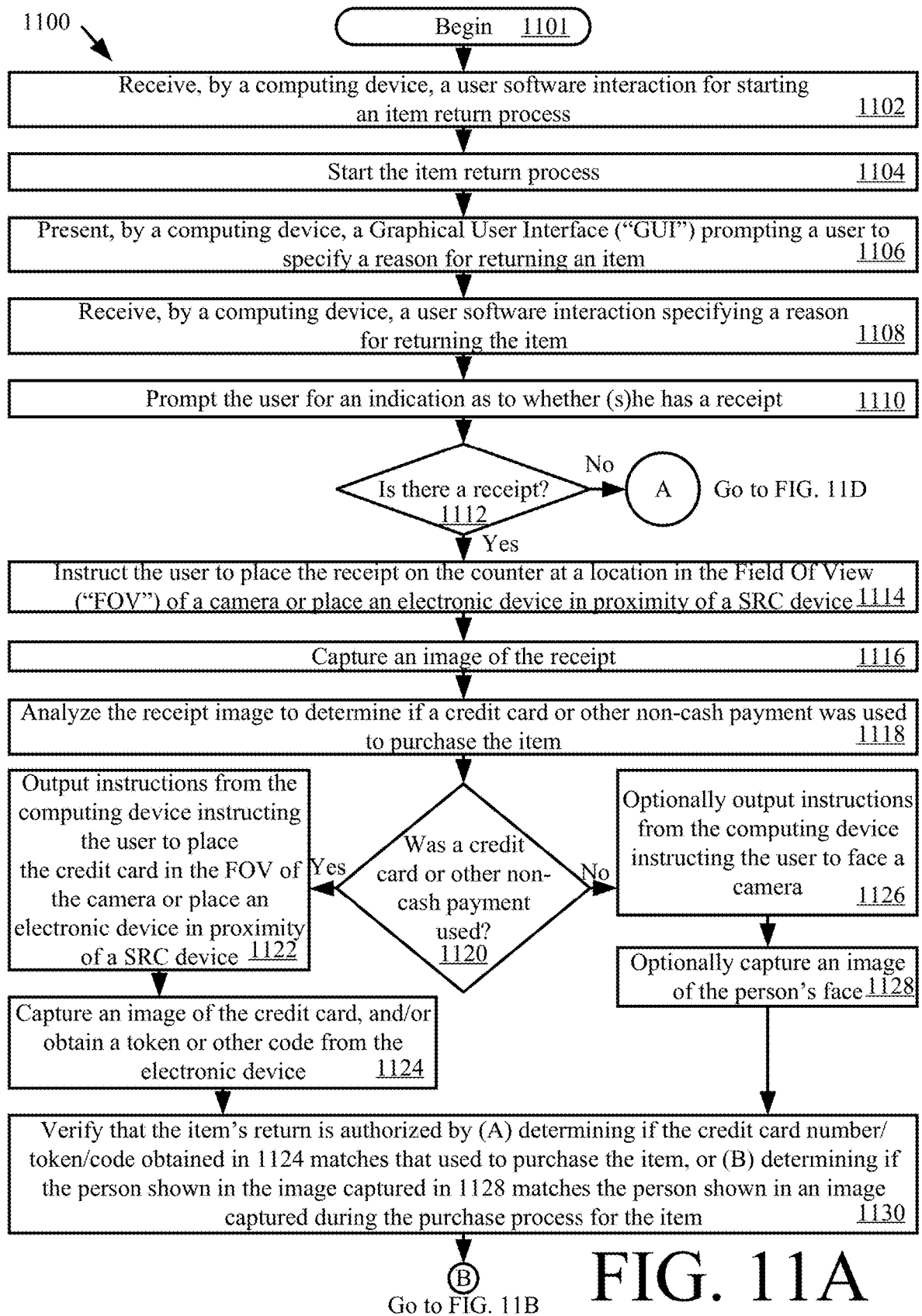
FIGS. 11A-11D (collectively referred to as "FIG. 11") provide a flow diagram of an illustration method for returning an item which was purchased.

Referring now to FIG. 11A, method 1100 begins with 1101 and continues with 1102 where a computing device (e.g., computing device 110 or computing device 118 of FIG. 1) detects the presence of an individual (e.g., person 132 of FIG. 1) and/or receives a user software interaction for starting an item return process. In some scenarios, the computing device includes a tablet, a smart phone or other portable electronic device. A tether, chain or other linkage may be provided for securely coupling the computing device to a return station (e.g., return station 102 of FIG. 1). This secure coupling ensures that the computing device will not be stolen, accidently misplaced, or damaged due to being dropped. The user software interaction can include, but is not limited to, the selection of an item from a drop down menu or the depression of a virtual button presented on a display (e.g., display 254 of FIG. 2) of the computing device. In response to the user-software interaction, the item return process is started in 1104.

Referring again to FIG. 11A, a Graphical User Interface ("GUI") is presented to the user of the computing device in 1106. By way of the GUI, the user is prompted to specify a reason for returning an item (e.g., item 136 of FIG. 1). The reasons can include, but are not limited to, defective, damaged, improper fit, wrong item, changed mind about item, and/or item arrived too late. In 1108, a user software interaction is performed to specify the reason for returning the item. The user software interaction can include, but is not limited to, entering text into a text box, selecting a reason from a list of reasons, selecting a box on the GUI, depressing a virtual button of the GUI, or using any other widget.

Next in 1110, the user (e.g., person 132 of FIG. 1) is prompted for an indication as to whether (s)he has a receipt. The receipt can be a hardcopy (or printed) receipt or an electronic receipt. In response to this prompt, the user performs a user-software interaction for indicating that (s)he has a receipt. The user-software interaction can include, but is not limited to, entering text in a text box, selecting a box on the GUI, depressing a virtual button of the GUI, or using any other widget.

Figure 11B:
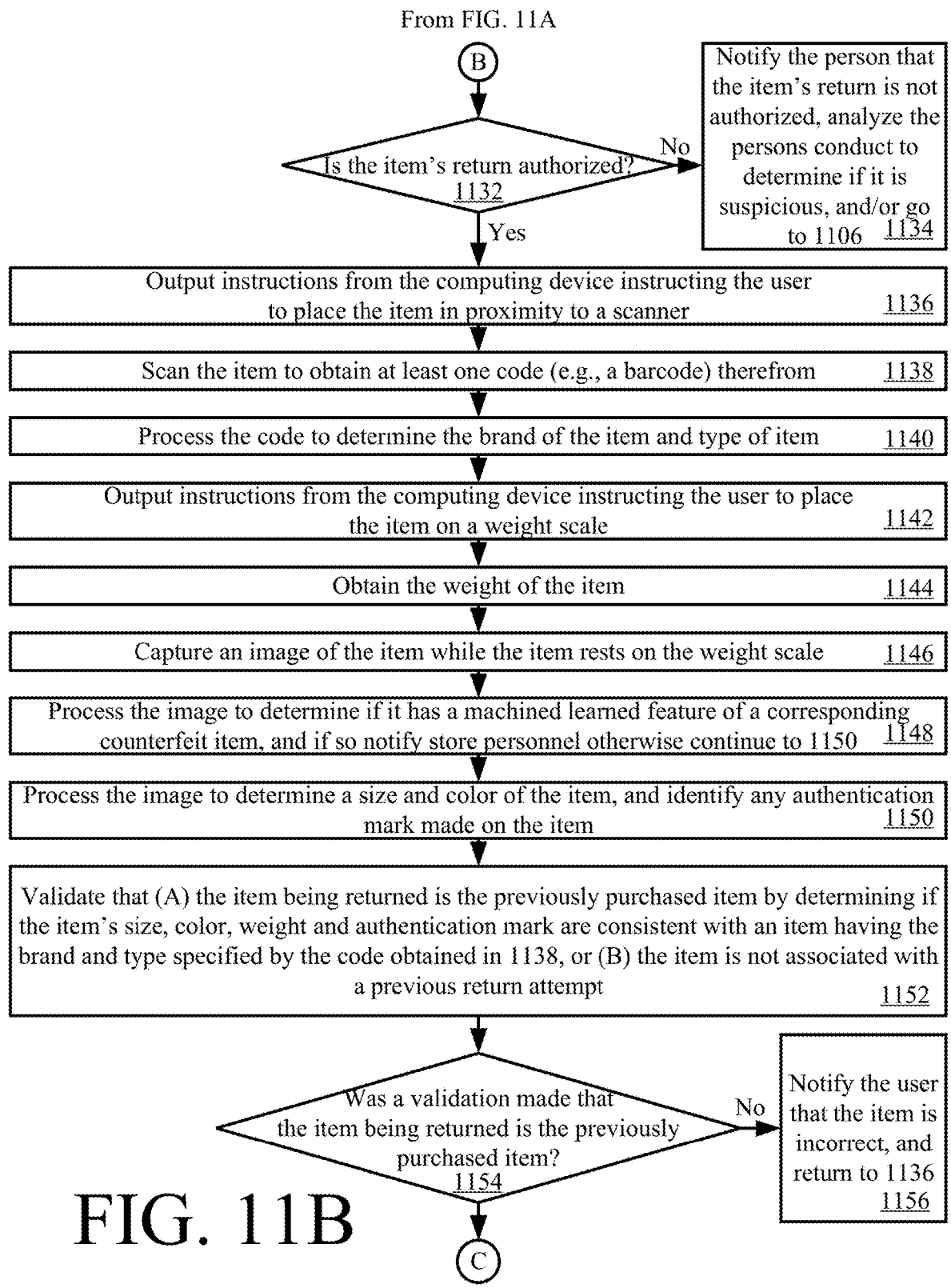
Figure 11C:
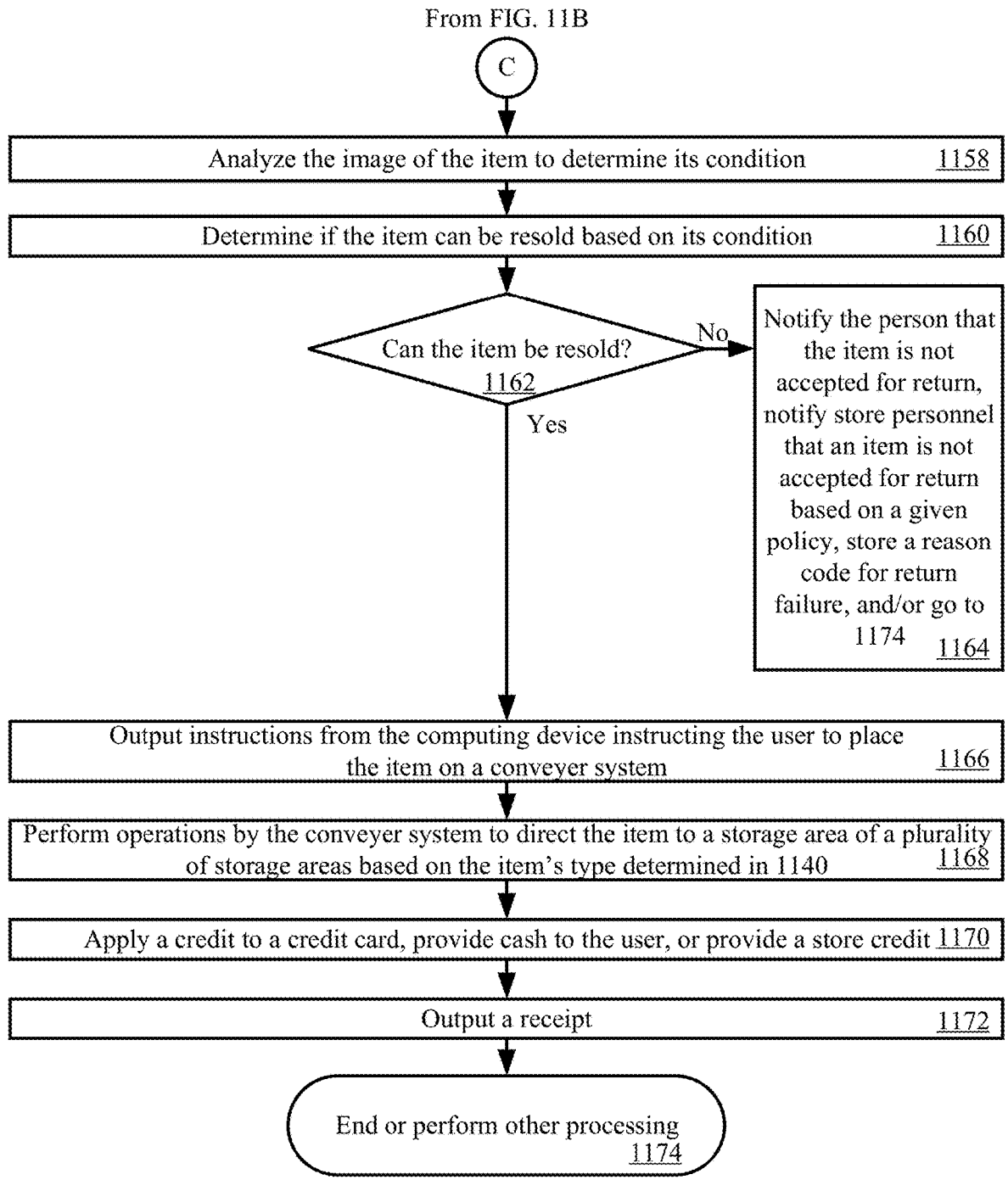
Figure 11D:
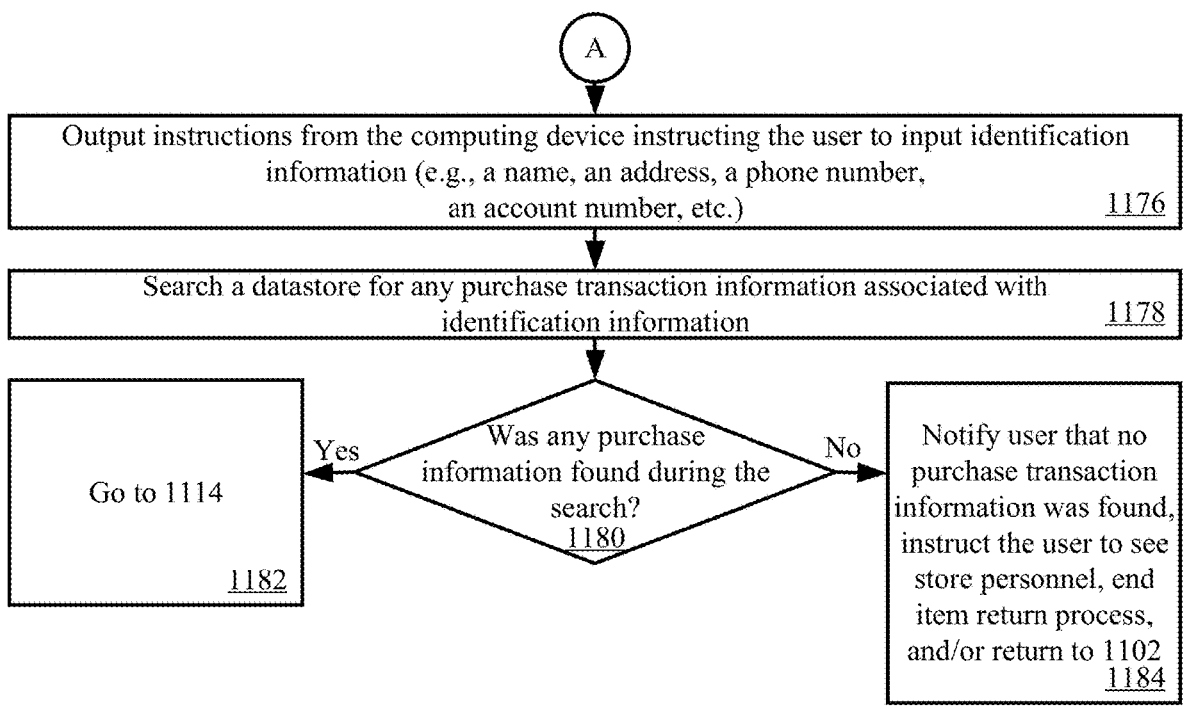

If the user does not have a receipt [1112:NO], then method 1100 continues with 1176-1178 of FIG. 11D. As shown in FIG. 11D, 1176-1178 involve: outputting instructions from the computing device instructing the user to input identification information (e.g., a name, an address, a phone number, an account number, etc.) into the system (e.g., system 100 of FIG. 1); and searching a datastore (e.g., datastore 124 of FIG. 1) for any purchase transaction information associated with the identification information. If purchase transaction information is not found during the search [1180:NO], then 1184 is performed where one or more actions is taken. These actions include, but are not limited to, notifying the user that no purchase transaction information was found, instructing the user to see store personnel, terminate the item return process, and/or return to 1102 of FIG. 11A. If purchase transaction information is found during the search [1180:YES], then 1182 is performed where method 1100 goes to 1114 which will be described below.

Returning to FIG. 11A, if the user does have a receipt [1112:YES], then method 1100 continues with 1114-1118. 1114-1118 involve: outputting instructions from the computing device instructing the user to place the printed receipt on the counter (e.g., counter 130 of FIG. 1) at a location in the FOV of a camera (e.g., camera 106 of FIG. 1) or place a display of an electronic device (e.g., a smart phone 182 of FIG. 1) showing the electronic receipt in the FOV of the camera; capturing an image of the receipt; and analyzing the receipt image to determine if a credit card or other non-cash payment was used to purchase the item.

If a credit card or other non-cash payment was used to purchase the item [1120:YES], then 1122-1124 are performed. 1122-1124 involve: outputting instructions from the computing device instructing the user to place the credit card in the FOV of the camera (e.g., camera 106 of FIG. 1); and capturing an image of the credit card. Additionally or alternatively, 1122-1124 involve: placing the electronic device (e.g., a smart phone 182 of FIG. 1) in proximity to an SRC device (e.g., scanner 126 of FIG. 1) of the return station (e.g., return station 102 of FIG. 1); and obtaining a token or other code from the electronic device.

If a credit card was not used [1120:NO], then optional 1126-1128 are performed which involve: outputting instructions from the computing device instructing the user to face a camera (e.g., camera 128 of FIG. 1); and capturing an image of the person's face.

Upon completing 1124 or 1128, method 1100 continues with 1130. In 1130, the enterprise system (e.g., system 100) verifies that the item's return is authorized by (A) determining if the credit card number, token or code obtained in 1124 matches that used to purchase the item or (B) determining if the person shown in the image captured in 1128 matches the person shown in an image captured by a POS station (e.g., POS station 180 of FIG. 1) during the purchase transaction for the item. These determinations can be made via comparison operations performed by a remote server (e.g., computing device 122 of FIG. 1) using purchase transaction data stored in a datastore (e.g., datastore 124 of FIG. 1). The purchase transaction data can include, but is not limited to, a time, a date, a list of purchased item identifiers, a price of each purchased items, a credit card number, a token, a code, and an image of the person(s) who purchased the items.

Subsequently, method 1100 continues with 1132 of FIG. 11B. As shown in FIG. 11B, 1132 involves determining whether authorization of the item's return has been verified. If not [1132:NO], then 1134 is performed where one or more actions are taken. These actions can include, but are not limited to, notifying the person that the item's return is not authorized, analyzing the person's conduct to determine if it is suspicious based on machine learned patterns of suspicious conduct/movements and/or machined learned normal movement patterns for the person, and/or return to 1106. Suspicious conduct can be detected by capturing a video of the person while (s)he is attempting to return the item, analyzing the video to detect a motion pattern specifying the person's movements, comparing the motion pattern to the machined learned patterns of suspicious conduct/movements, and/or comparing the motion pattern to the machined learned normal movement patterns for the person. If a match exists between the motion pattern and at least one of the machined learned patterns of suspicious conduct/movements, then suspicious conduct is detected. Otherwise suspicious conduct is not detected. If a match exists between the motion pattern and the machined learned normal movement patterns for the person, then suspicious conduct is not detected. Otherwise suspicious conduct is detected.

If the item's return is authorized [1132:YES], then 1136 is performed where instructions are output from the computing device instructing the user to place the item in proximity to a scanner (e.g., scanner 126 of FIG. 1). In 1138, the item is scanned to obtain at least one code therefrom. The code can include, but is not limited to, a barcode, a SKU and/or a UPC. The code is processed in 1140 to determine the brand of the item and the type of item.

Next in 1142, instructions are output from the computing device (e.g., computing device 110 of FIG. 1) instructing the user to place the item (e.g., item 136 of FIG. 1) on a weight scale (e.g., weight scale 114 of FIG. 1). The weight scale then measures the weight of the item in 1144. The measured weight can be passed to an internal computing device (e.g., computing device 118 of FIG. 1) of the return station 102 for storage and/or processing. The measured weight can be stored locally in a memory (e.g., memory 212 of FIG. 2) and/or remotely in a datastore (e.g., datatore 124 of FIG. 1).

In 1146, an image of the item is captured by a camera (e.g., camera 106 of FIG. 1) while the item rests on the weight scale. The camera can include, but is not limited to, a 3D camera such that the item's height is obtained in addition to its length and width. The captured image is processed in 1148 to determine if it has a machined learned feature of a corresponding counterfeit item. This determination can be made by extracting features of the item from the captured image, and comparing the extracted features to machined learned features of one or more counterfeit items. If a match exits between the extracted features and the machined learned features, store personnel is notified. If a match does not exist between the extracted features and the machined learned features, method 1100 continues with 1150.

1150 involves processing the image to determine a size and color of the item, as well as identify any authentication mark made on the item. Next, operations are performed in 1152 to validate that the item being returned is the previously purchased item. This validation is made by determining (A) if the item's size, color, weight and authentication mark are consistent with an item having the brand and type specified by the code obtained in 1138, or (B) if the item is not associated with a previous return attempt. Determination (B) can be made based on result from comparing the code obtained in 1138 to a code acquired in a previous return attempt. If a match exists, then it is determined that the item is associated with a previous return attempt. Otherwise, a determination is made that the item is not associated with a previous return attempt.

If a validation is not made that the item being returned is the previously purchased item [1154:NO], then 1156 is performed where one or more actions are taken. These actions can include, but are not limited to, notifying the user that the item is incorrect, and/or returning to 1136.

If a validation is made that the item being returned is the previously purchased item [1154:YES], then method 1100 continues with 1158 of FIG. 11C. As shown in FIG. 11C, 1158 involves analyzing the image of the item to determine its condition. A determination is then made in 1160 as to whether or not the item can be resold based on its condition. For example, an item can be resold if it is not damaged and/or if its condition is the same as that at the time of purchase. If the item cannot be resold [1162:NO], then 1164 is performed where one or more actions is taken. These actions can include, but are not limited to, notifying the person (e.g., person 132 of FIG. 1) that the item is not accepted for return, notifying store personnel (e.g., store personnel 134 of FIG. 1) that an item is not accepted for return based on a given policy, store a reason code for the return failure, and/or go to 1174 which will be described below.

If the item can be resold [1162:YES], then 1166-1172 are performed. 1166-1172 involve: outputting instructions from the computing device (e.g., computing device 110 of FIG. 1) instructing the user (e.g., person 132 of FIG. 1) to place the item (e.g., item 136 of FIG. 1) on a conveyer system (e.g., conveyer system 104 of FIG. 1); performing operations by the conveyer system to direct the item to a storage area of a plurality of storage areas (e.g., storage bins 116 of FIG. 1) based on the item's type determined in previous 1140; and/or outputting a receipt. The receipt can be a printed receipt or an electronic receipt. Subsequently, 1174 is performed where method 1100 ends or other processing is performed.

The present solution can be used in various applications. In some scenarios, an image of the purchaser and/or associated metadata are recorded when an item is purchased. This image and metadata can be used to authenticate the person when (s)he returns the item to the store. This authentication is useful when the receipt is lost.

In other scenarios, an image of the purchaser and/or associated metadata are recorded when an item is purchased. Also, machine learning operations are performed to (A) determine the state or condition of the item at the time of purchase and (B) determine the state or condition of the item at the time of return. The state/condition of (B) is compared to the state/condition of (A) when the item is returned. This could stop cases where someone returns an item and claims that the item was damages when they bought it or cases where someone tries to return a counterfeit item that doesn't match the item they purchased.

The present solution can also be used to stop fraudulent returns. For example, the present solution could stop cases where a person takes an item of the retail floor and tries to return the item without any purchase thereof. This could save retail stores a significant amount of money in improper store credits.

In some scenarios, voice recognition is employed. System 100 would further comprise an audio microphone, a display, and an audio speaker. These additional components would be connected to the computing device 110, computing device 118 and/or the enterprise system 122, 123. AI could process the images and output questions on the display or from the audio speaker. The customer could hold his(her) credit card in from of a camera 106, 128 so that a credit card number could be read therefrom. The customer could then be prompted to input additional authenticating information such as a zip code associated with the credit card. This would allow system 100 to be implemented with simple, low cost hardware.

Illustrations are provided in FIGS. 12A-12J showing how an item return process may be performed using a return station comprising a kiosk, such as that shown in FIGS. 3-4 and/or 5-10. As shown in FIG. 12A, an individual comes in proximity to the return station. Next, the individual performs a user-software interaction for initiating operations of the return station as shown in FIG. 12B. This user-software interaction can simply be a touch of the touch display screen (e.g., display 254 of FIG. 2). In response to the user-software interaction, the return station prompts the individual to select an option for finding a particular transaction. For example, the individual is prompted to select (1) a scan receipt option, (2) a scan credit card option, or (3) a membership loyalty option. Once an option is selected, the return station prompts the individual to input the requisite information via a scanner, keypad or other input means.

In the scenarios where the individual selects option (1), the individual will be guided by the return station through the receipt scanning process. For example, the return station will prompt the individual to place the receipt in the FOV of a scanner as shown in FIG. 12D. The receipt can include, but is not limited to, a printed receipt or an electronic receipt displayed on a mobile device (e.g., mobile device 182 of FIG. 1). The return station can detect when the receipt is properly placed in the FOV of the scanner (e.g., scanner 126 of FIG. 1) or camera (e.g., camera 106 of FIG. 1). Upon such detection, the return station performs operations to scan the receipt to obtain a unique identifier for a given transaction. The return station may also perform operations to valid that the receipt is associated with the given facility or business entity. Upon such validation, the return station obtains transaction information including a list of items associated with the given transaction (e.g., a ladies shirt, a pair of shoes, and a purse). Item related information (e.g., price) may also be included in the obtained transaction information. The obtained transaction information is presented to the individual by the return station, as shown in FIG. 12E.

The individual is then prompted by the return station to move an item in the FOV of the scanner (e.g., scanner 126 of FIG. 1) or camera (e.g., camera 106 of FIG. 1). In response to the prompt, the individual places the item (e.g., a ladies shirt) in the FOV of the camera (e.g., camera 106 of FIG. 1) and/or on a weight scale (e.g., weight scale 114 of FIG. 1), as shown in FIG. 12F. The return station performs operations at this time to learn visual characteristics of the item and/or the weight of the item. This learned information about the item is then compared to stored information associated with the items identified by the displayed transaction information. This comparison operation is performed by the return station to confirm that the physical item being returned by the individual is indeed one of the items associated with the given transaction. If not, the item's return is denied. If so, then the return process continues as described below.

The return station then modifies the displayed transaction information to highlight the transaction information associated with the physical item being returned, as shown in FIG. 12G. Additionally or alternatively, the return station will prompt the individual to select the correct item information from the displayed transaction information, or confirm that the highlighted information is the correct information for the physical item being returned.

As shown by FIG. 12H, the return station then prompts the individual to place the item in the return bin where an internal weight scale will verify the weight against the earlier weight measurement. Once the items weight is verified, the return station prompts the individual to place an associated credit card or other electronic payment means in the FOV of the scanner or camera, as shown by FIG. 12I. Next as shown in FIG. 12J, the return station presents to the individual return and processing information. A new receipt is printed and/or electronically sent to a computing device of the individual. At this time, the return process is complete and the operations of the return station are re-set so that a next return process can be performed in the same or similar manner as that described above in relation to FIGS. 12A-12J.

Figure 5:
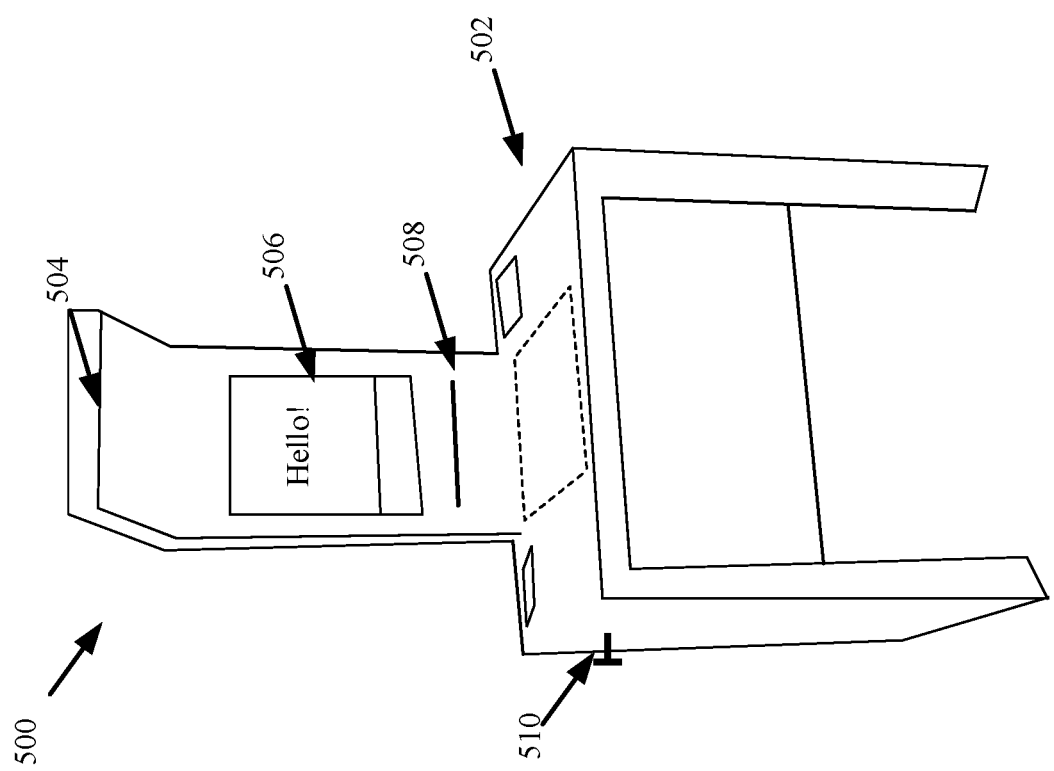
Figure 8:
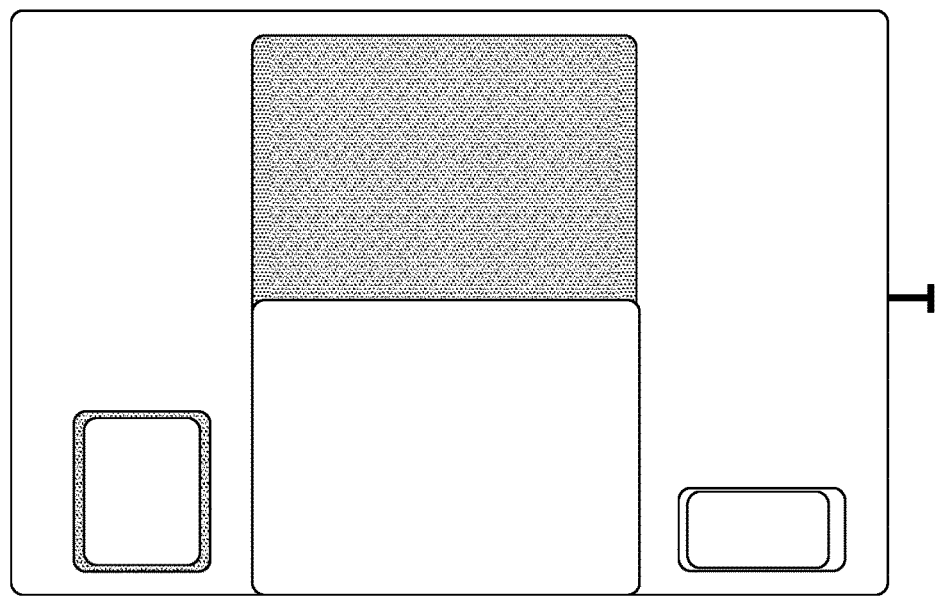
Figure 7:
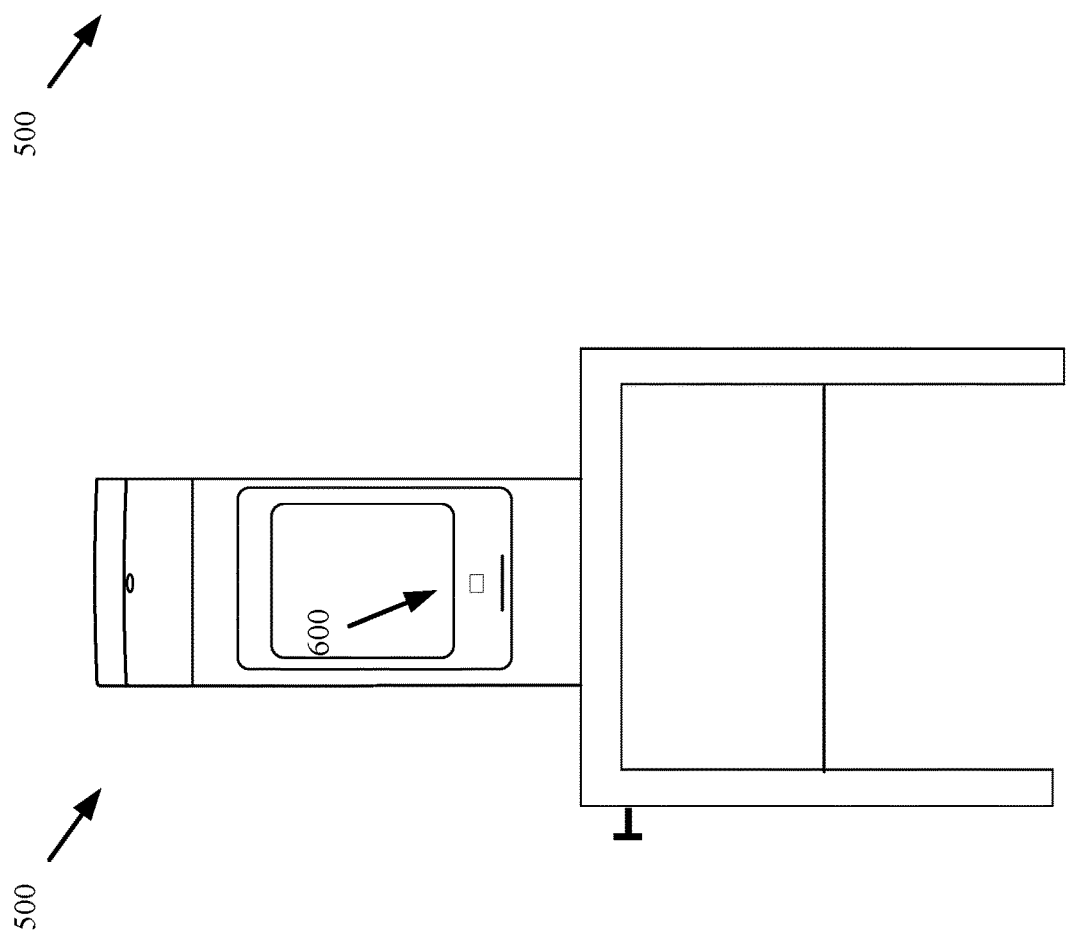
Figure 10:
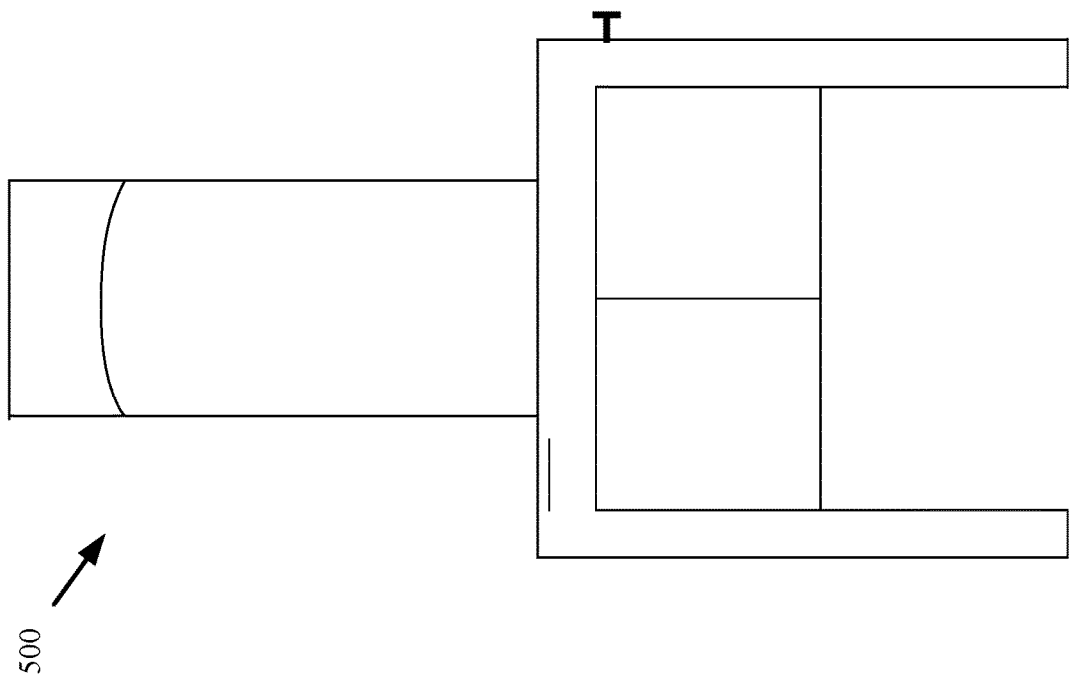
Figure 9:
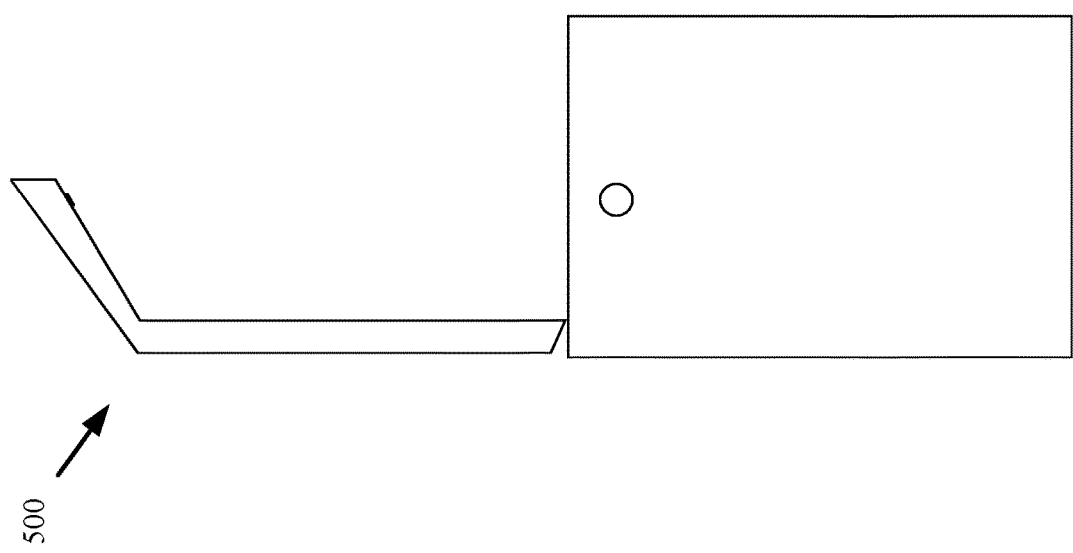
Figure 13:
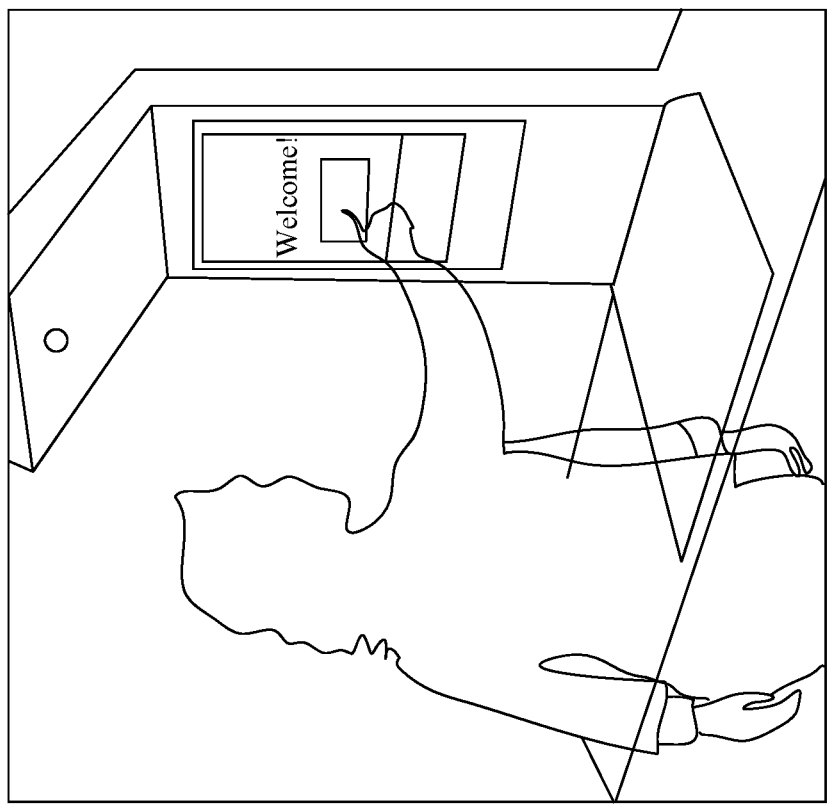
FIG. 13 provides an illustration of showing an individual initiating a return process using a return station.

FIG. 13 provides an illustration showing an individual initiating a return process using a return station (e.g., return station 102 of FIG. 1 or 500 of FIG. 5). In FIG. 13, the individual initiates a return at the return station by interacting with an input device, such as the touch screen (e.g., display 254 of FIG. 2) and/or keyboard (e.g., keyboard 250 of FIG. 2). In other scenarios, the individual's mobile device (e.g., mobile device 182 of FIG. 1) may wirelessly communicate directly with the return station to initiate the return. The wireless communication can be achieved using NFC technology and/or SRC technology (e.g., Bluetooth).

Figure 14:
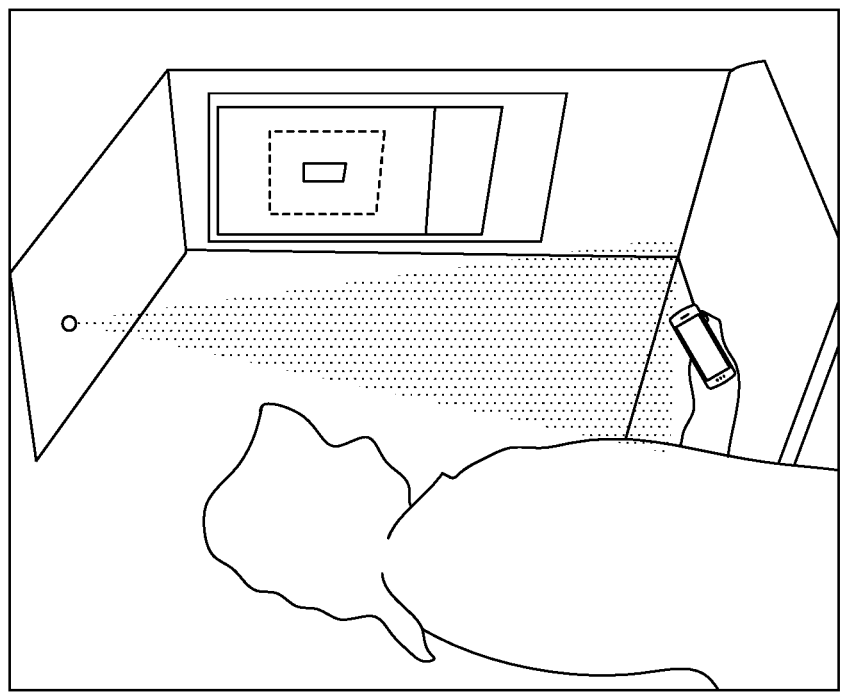
FIG. 14 provides an illustration showing a return station acquiring information from a mobile device of the individual shown in FIG. 13.

FIG. 14 provides an illustration showing a return station acquiring information from a mobile device of the individual shown in FIG. 13. The information can include, but is not limited to, a unique identifier of the mobile device, account information, member loyalty information, transaction information, and/or a reference key which allows the return station to retrieve the required data from local or more database(s) (e.g., database 124 of FIG. 1). The information may be acquired by the return station using a scanner, a camera or wireless communications. In the scanner scenarios, image data presented on the mobile device is scanned by the return station. The image data can include, but is not limited to, a QR code, a bar code, and/or a human readable indicia (e.g., a transaction number). The scanning of the image data causes the return process to be initiated.

Figure 15:
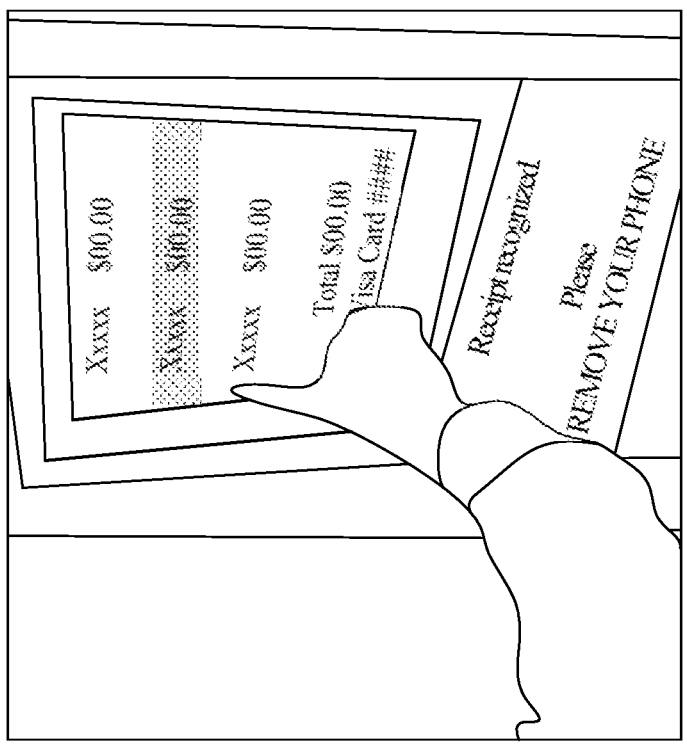
FIG. 15 provides an illustration showing the individual of FIGS. 13-14 performing a user-software interaction with the return station for selecting an item that is being returned.

FIG. 15 provides an illustration showing the individual of FIGS. 13-14 performing a user-software interaction with the return station for selecting an item that is being returned. The user-software interaction is achieved using a touch screen by which the individual selects an item that is being returned from a list of item displayed by the return station.

Figure 16:
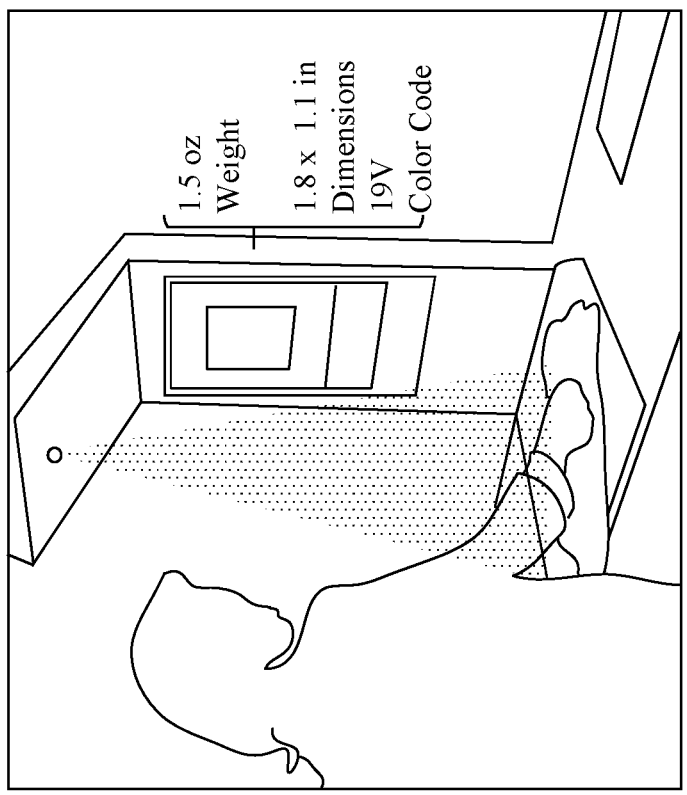
FIG. 16 provides an illustration showing the individual placing the item on a weight scale of the return station shown in FIGS. 13-15.

FIG. 16 provides an illustration showing the individual placing the item on a weight scale of the return station shown in FIGS. 13-15. In turn, the return station captures item weight data. An optical scanner that is positioned above the weight scale captures visual data. The return station then correlates the collected weight/visual data with pre-stored item data for the item the individual is attempting to return.

Other data may additionally or alternatively be obtained from the item via a tag reader or scanner included with the return station.

It should be noted that the data collected by the scale and visual image scan are an integral aspect of the present solution, because the scanned item tag data is not considered sufficient for a self-service return. The return station must verify that the item being returned corresponds to the item tag. Otherwise, the individual could present a tag from a more expensive item to obtain a fraudulent refund.

Figure 17:
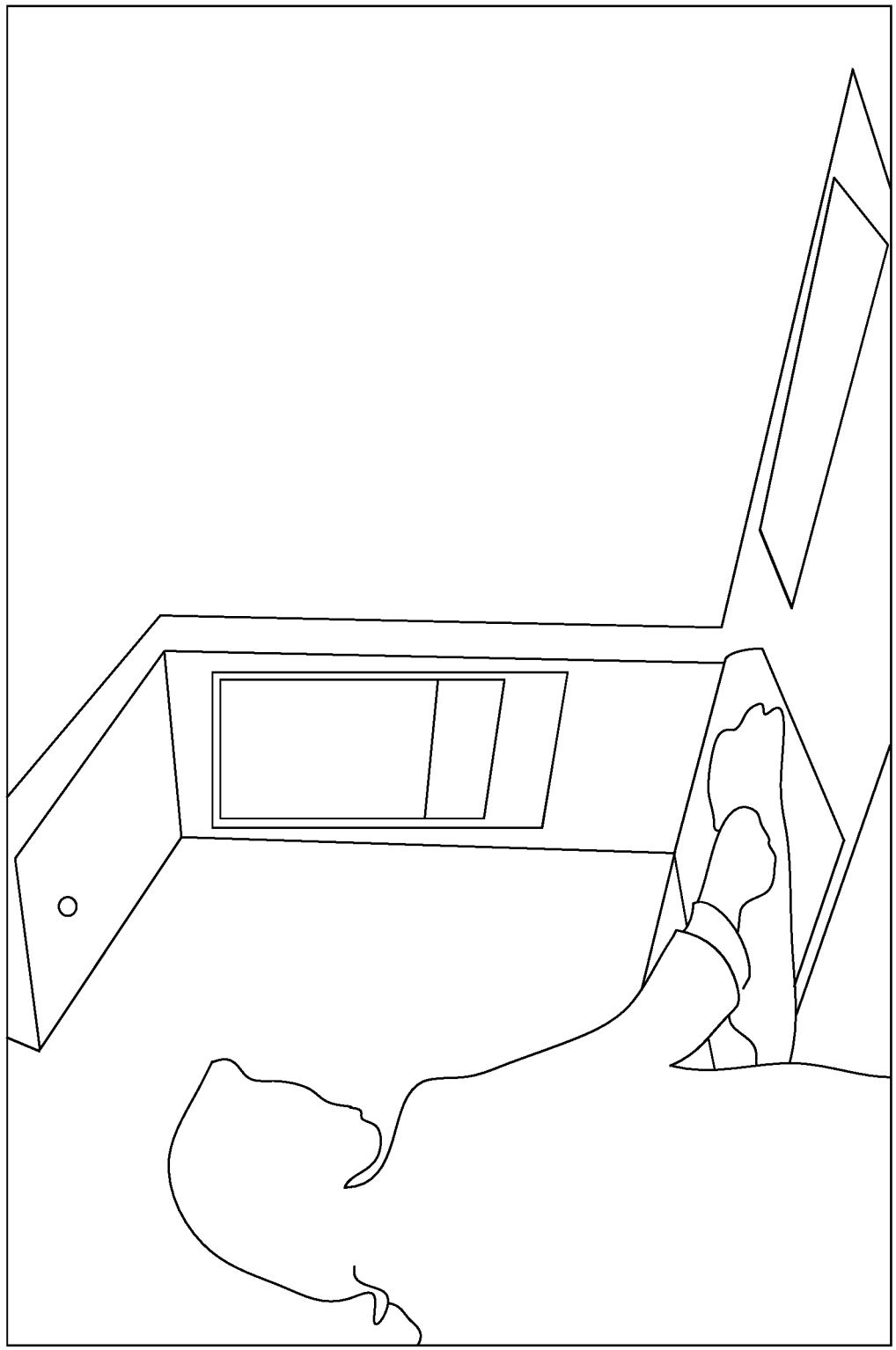
FIG. 17 provides an illustration showing the return station of FIGS. 13-16 prompting the individual to place the item in a return bin.
Figure 18:
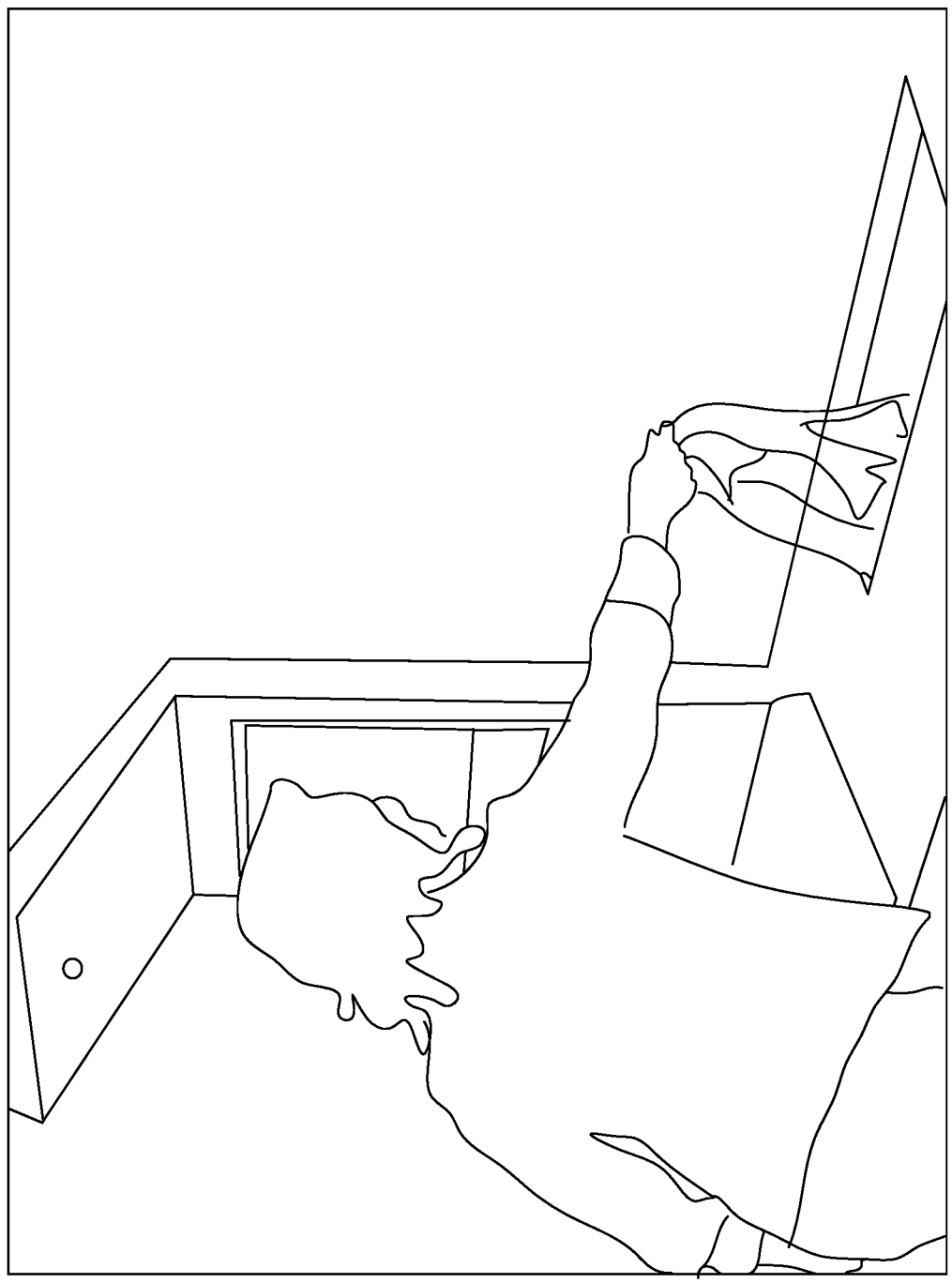
FIG. 18 provides an illustration showing the individual placing the item in the return bin of the return station shown in FIGS. 13-17.

FIG. 17 provides an illustration showing the return station of FIGS. 13-16 prompting the individual to place the item in a return bin. The return station analyzes the collected data pertaining to the returned item, and approves the return and refund to the customer. The customer is then visually instructed to place the items in a return slot. FIG. 18 provides an illustration showing the individual placing the item in the return bin of the return station shown in FIGS. 13-17.

Figure 19:
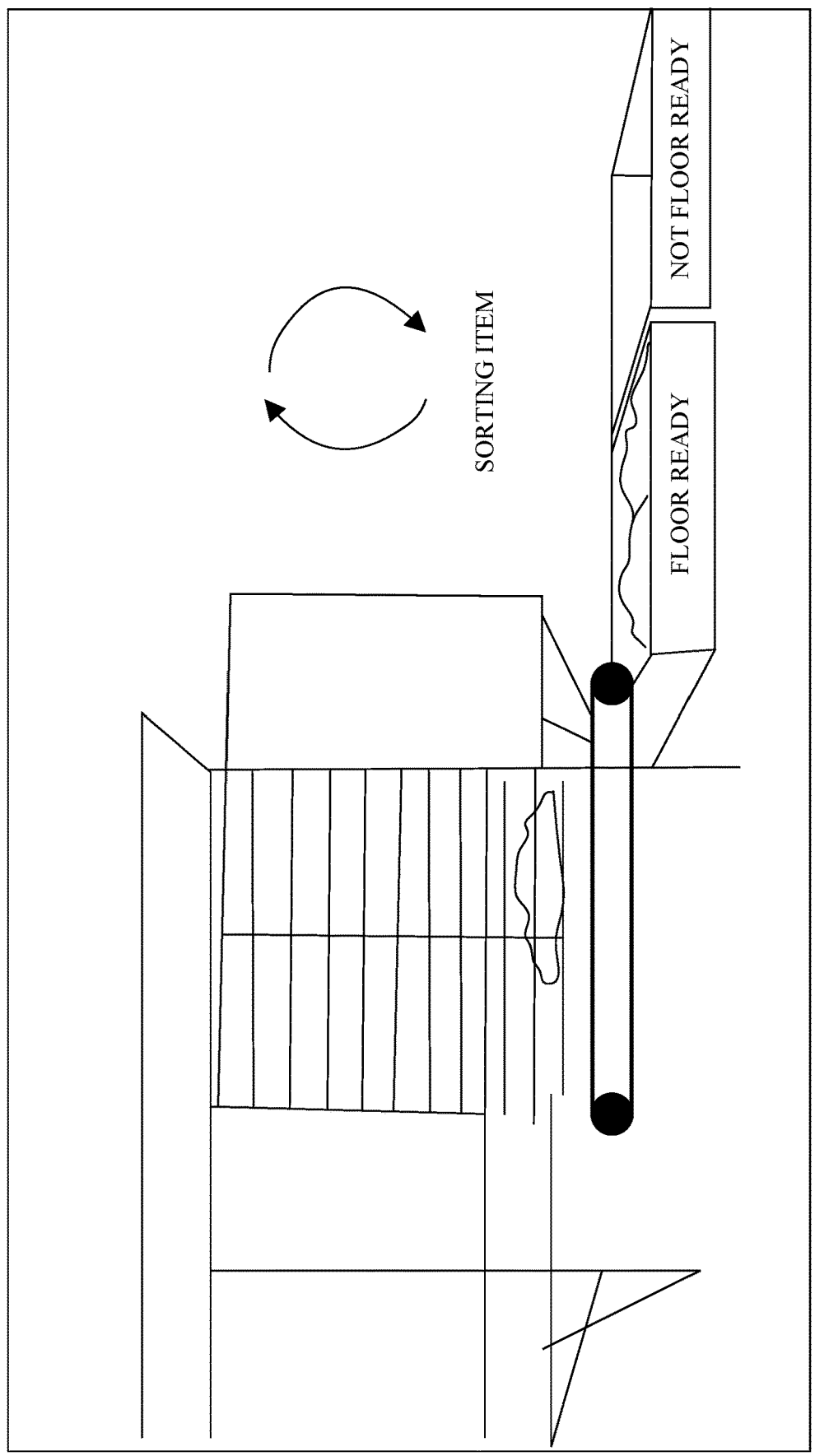
FIGS. 19-20 provide illustrations showing a return station with a conveyer belt for a removal of returned items.
Figure 20:
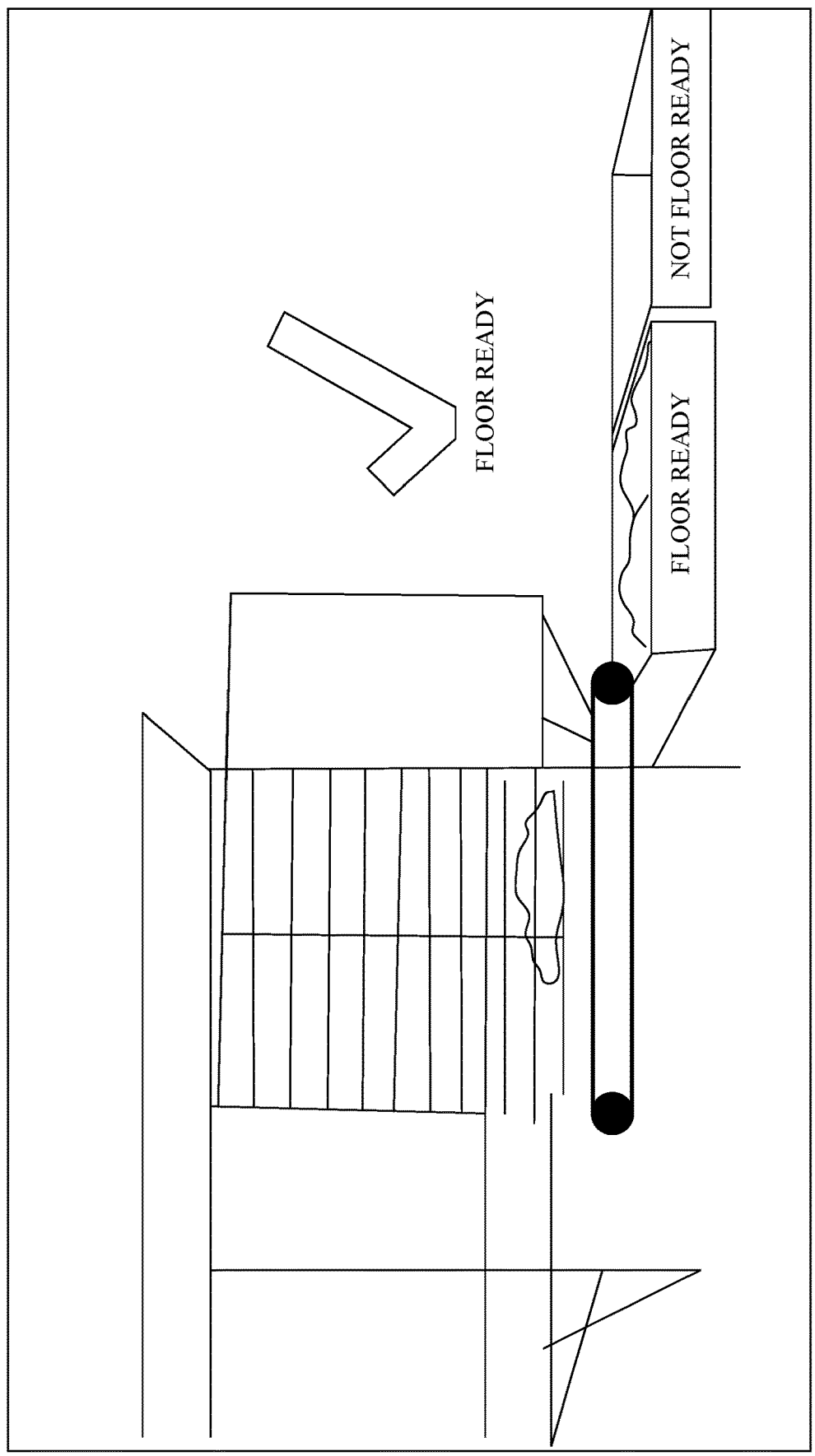

FIGS. 19-20 provide illustrations showing a return station with a conveyer belt for a removal of returned items. In this scenario, the returned items can be automatically sorted.

Figure 21:
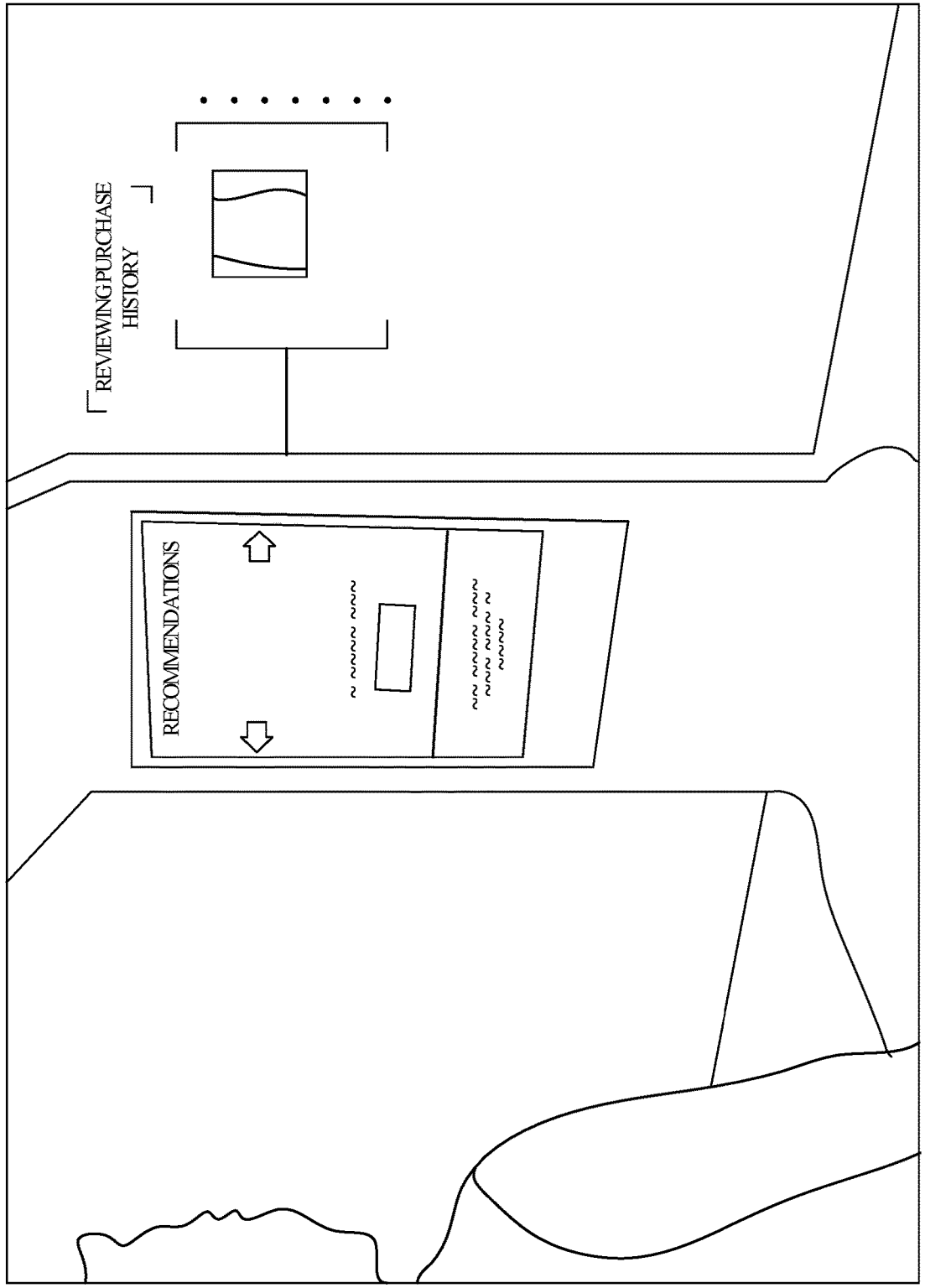
FIG. 21 provides an illustration that is useful for understanding that the return station is able to generate recommendations for other items that may be of interest to the individual (e.g., based on a shopping and/or purchase history associated with the individual and/or a particular account).
Figure 22:
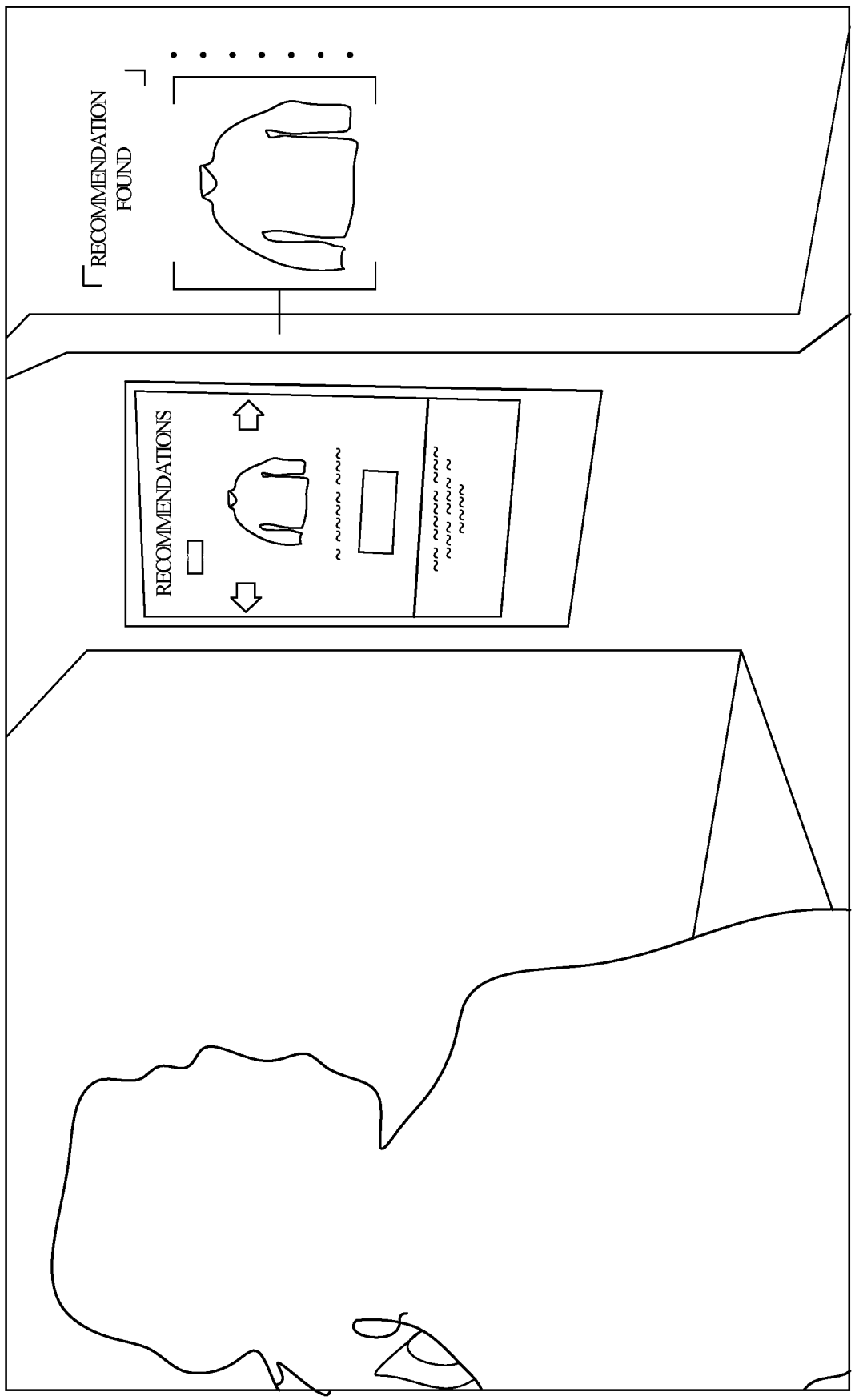
FIG. 22 provides an illustration showing the return station displaying the generated recommendations for other items that may be of interest to the individual.

FIG. 21 provides an illustration that is useful for understanding that the return station is able to generate recommendations for other items that may be of interest to the individual (e.g., based on a shopping and/or purchase history associated with the individual and/or a particular account). FIG. 22 provides an illustration showing the return station displaying the generated recommendations for other items that may be of interest to the individual.

Figure 23A:
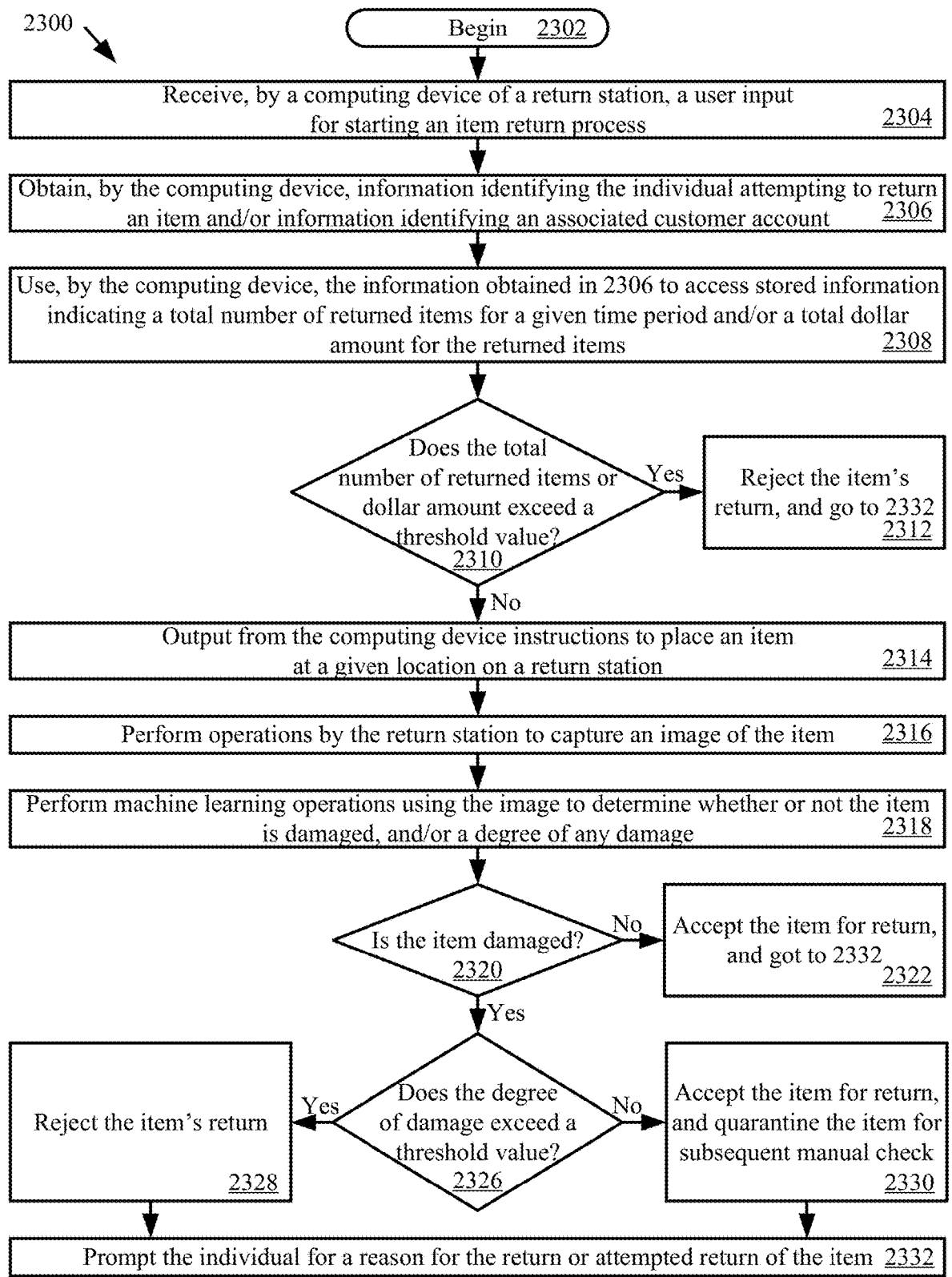
FIGS. 23A-23B (collectively referred to herein as "FIG. 23") provides an illustrative method for returning an item.
Figure 23B:
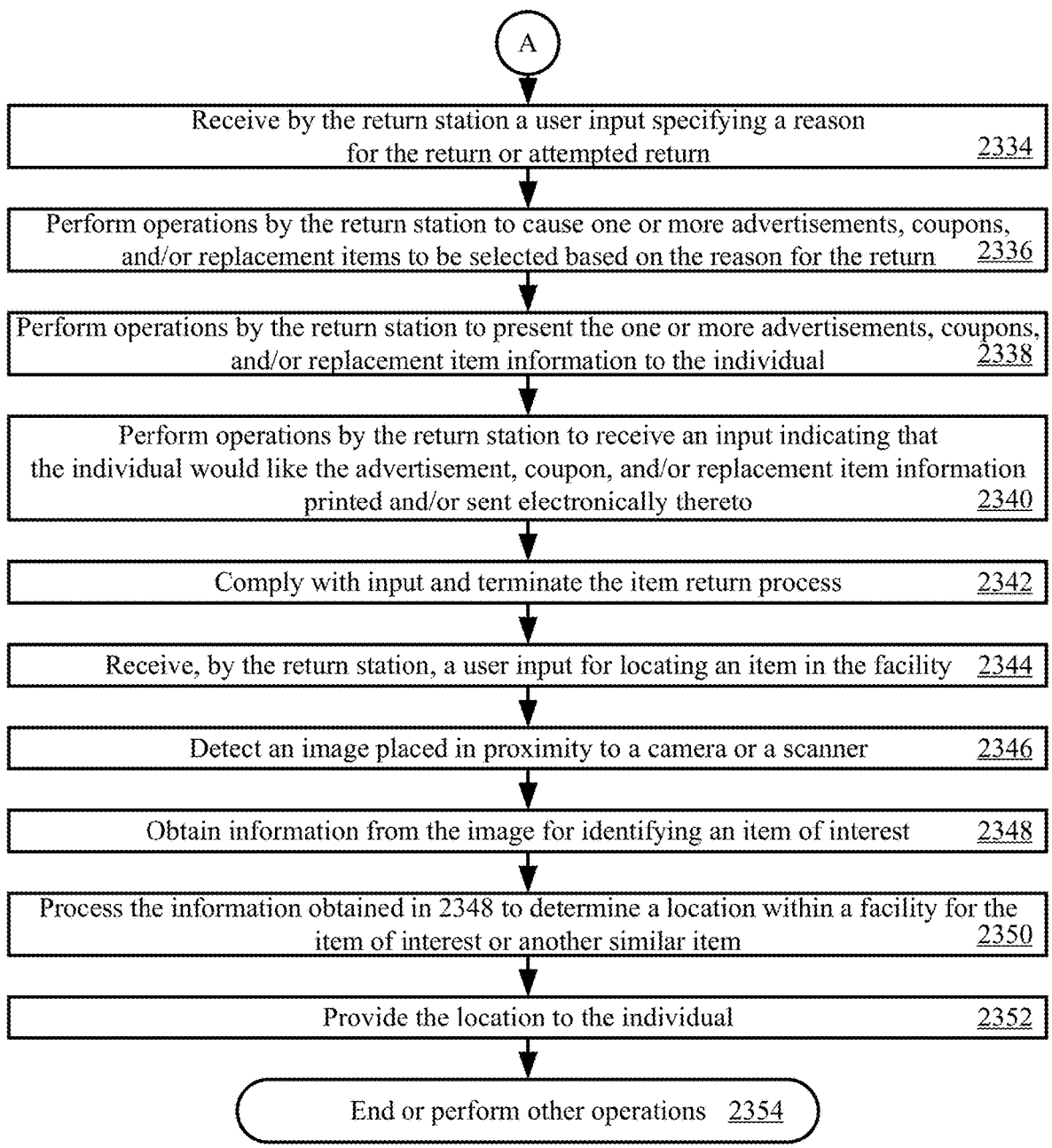

Referring now to FIG. 23, there is provided a flow diagram of an illustrative method 2300 for returning an item. Method 2300 begins with 2302 and continues with 2304 where a computing device (e.g., computing device 118 of FIG. 1) of a return station (e.g., return station 102 of FIG. 1) receives a user input for starting an item return process. The user input may be facilitated by a touch screen (e.g., display 254 of FIG. 2), a keyboard (e.g., keyboard 250 of FIG. 2), and/or other input device. In 2306, the computing device obtains information identifying the individual attempting to return an item (e.g., a Media Access Control number, contact information, and/or biometric information) and/or information identifying an associated customer account (e.g., an account number).

The information obtained in 2306 is used by the computing device in 2308 to access stored information indicating a total number of returned items for a given time period (e.g., N weeks, N months, or N years) and/or a total dollar amount for the returned items. If the total number of returned items or the dollar amount exceeds a threshold value [2310:YES], then 2312 is performed where the item's return is rejected. Method 2300 then continues to 2332 which will be described below. Notably, the threshold value for the total number of returned items and the threshold value for the dollar amount are customizable values.

If the total number of returned items or the dollar amount does not exceed a threshold value [2310:NO], then 2314 is performed where the computing device outputs instructions to place an item at a given location on a return station. The return station then performs operations in 2316 to capture an image of the item. The return station also performs machine learning operations in 2318 using the image to determine whether or not the item is damaged and/or a degree of any damage (e.g., a number indicating that the item is damaged in a certain manner or aspect, or a number representing that the item is not damaged but the packaging is damaged in a certain manner or aspect). If the item is not damaged [2320:NO], then 2322 is performed where the item is accepted for return. Method 2300 then goes to 2332 which will be described below.

If the item is damaged [2320:YES], then 2326 is performed where a determination is made as to whether the degree of damage exceeds a threshold value. The threshold value is customizable. If so [2326:YES], then 2328 is performed where the item's return is rejected. Method 2300 then continues with 2332 which will be discussed below. If not [2326:NO], then the item is accepted for return. However, the item is quarantines for subsequent manual check. Method 2300 then continues with 2332.

In 2332, the return station prompts the individual for a reason for the return or attempted return of the item. In 2334 of FIG. 23B, the return station receives a user input specifying a reason for the return or attempted return. The return station performs operations in 2336 to cause one or more advertisements, coupons, and/or replacement items to be selected based on the reason for the return. The advertisement(s), coupon(s) and/or replacement item information is presented to the user in 2338. The return station receives an input in 2340 indicating that the individual would like the advertisement(s), coupon(s), and/or replacement item information printed and/or sent electronically thereto. The return stations performs actions in accordance with the input received in 2340 to print and/or electronically send the advertisement(s), coupon(s), and/or replacement item information, as shown by 2342. The return station also terminates the return process in 2342.

In 2344, the return station receives a user input for locating an item in the facility. The return station detects an image placed in proximity to a camera or a scanner thereof, as shown by 2346. Information is obtained by the return station in 2348 from the image. The information identifies an item of interest to the individual. The information obtained in 2348 is processed in 2350 to determine a location within a facility for the item of interest or another similar item. The location is provided to the individual in 2352 (e.g., via presentation on a display of the return station and/or via a wireless communication with a mobile device). Subsequently, 2354 is performed where method 2300 ends or other operations are performed (e.g., return to 2302).

As noted above, the present solution allows a customer to return an item. During the item return process, the customer may place the item on a counter (e.g., counter 130 of FIG. 1) of a return station (e.g., return station 102 of FIG. 1), which would then take a picture of the item and determine if it is damaged by using machine learning. The machine learning can be used to learn what an undamaged version of the item looks like, to learn what a current state of the item is, to determine whether the item being returned is damaged, and/or to determine a degree of damage that the item has sustained.

The present solution also provides a return station that can offer targeted ads and/or coupons to customers based on item return reasons. When a customer returns an item and selects a reason for returning the item (e.g., the item didn't fit or match expectations), the return station presents (a) targeted ads based on the item's reason for return and/or (b) coupon offers for similar items to entice the customer to purchase a different item. A product catalog and/or item categorization can be used to facilitate this feature of the present solution.

Based on the item return reason(s), the customer may also receive a discount coupon on an existing item to lure them in keeping the item or a general discount coupon to buy anything within the store. This attracts customers to spend more time at the store when they come to return items and generate revenue for stores. This is based on customer history with returns. More returns a customer performs results in less discount coupons. When a customer returns item(s), based on the item return reason(s), targeted discount coupon may be printed on the return receipt. This attracts customers to buy more products.

In some scenarios, store-customizable thresholds are provided for use by the return station in deciding whether to accept or reject an item's return. If the return station can detect whether the item is damaged, the business entity can set ahead of time whether or not it will accept damaged items to be returned. The business entity can choose to accept the item for return, accept the item for return but quarantine the item for a manual check later, or reject the item for return. The business entity may also be able to set the level of damage it is willing to accept (e.g., the item's packaging is damaged but the item is not damaged). The business entity could also decide to only allow a certain number of returns or a certain amount of dollars returned per month or year per a given person. If the return is beyond the set threshold, the return would be rejected. The problem solved by this feature of the present solution is that different associates in the same facility may make different decisions on whether to accept a return. Applying thresholds storewide or company-wide via an application means that the procedures of the business entity are followed consistently across the board. This advantageously prohibits the return of items which should be allowed for return.

In some scenarios, during the return process, the return station can provide suggestions for replacement items based on return reason(s). This feature extends the frictionless return process and allows a business entity to suggest replacement items to customers based on the reasons of return (e.g., the item did not fit, the item is damaged, or the item did not meet expectations). When a customer is returning an item and based on the reason for the item's return, the return station may inform the customer of alternative items and locations of the same in the facility. This solves a problem for retailers by allowing them to quickly suggest alternative replacements for items that customers are returning, so that they can sell another item based on the suggestions and will allow the customer to quickly find a replacement item in the store and then purchase that item.

In some scenarios, the present solution allows customers to scan pictures of items for purposes of finding the locations of the same in a facility using a machine learning image recognition algorithm. If an item is not found in an inventory, similar items may be brought to the customers attention. This makes it very easy for customers to find items and choose similar items that may be cheaper in price or better quality. The customers do not have to wait for an associate to help them, which will enhance customer experience and cut labor cost for the store.

The present solution also allows customers to directly find the location of an item or product in inventory by using a picture or a physical item itself (may have an old tool or broken tool they can bring in to the store). Machine learning can be leveraged to classify images and match the contents of the images to the contents of an inventory. If an exact match does not exist between the image content and the inventory content, one or more similar products may be presented to the customers via the return station. This allows the customers to find similar items in inventory. The customers do not have to wait for an associate to help them.

In some scenarios, a self-checkout system utilizes machine learning for item classification. Instead of having to manually scan/checkout each item individually, the present solution allows customers to place their items on a conveyer system (e.g., conveyer system 182 of FIG. 1) of a POS station (e.g., POS station 180 of FIG. 1). The POS station uses an image recognition algorithm to determine which items the customer is purchasing. This feature of the present solution solves the problem of long lines at self-checkout and/or regular checkout areas in stores. It facilitates better customer satisfaction and lower labor costs.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for returning an item, comprising:
    performing operations by a self-return station to capture an image of a first item that an individual is trying to return to an entity;
    performing machine learning operations by the self-return station using the image to determine whether the first item is damaged and to determine a degree of item damage;
    allowing, by the self-return station, a return of the first item to the entity when the first item is not damaged or when the degree of item damage does not exceed a threshold value; and
    preventing, by the self-return station, the return of the first item to the entity when the first item is damaged and the degree of item damage exceeds the threshold value.

2. The method according to claim 1, further comprising performing operations by the self-return station to (1) allow the return of the first item to the entity and (2) cause the first item to be quarantined, when the first item is damaged and the degree of item damage does not exceed the threshold value.

3. The method according to claim 1, further comprising:
    obtaining, by the self-return station, first information identifying the individual or second information identifying a customer account associated with the individual; and
    using, by the self-return station, the first or second information to access third information specifying at least one of a total number of returned items for a given time period and a total dollar amount for the returned items.

4. The method according to claim 3, further comprising rejecting, by the self-return station, the return of the first item to the entity when the total number of returned items or the total dollar amount exceeds a threshold value.

5. The method according to claim 3, further comprising accepting, by the self-return station, the return of the first item to the entity when the total number of returned items or the total dollar amount does not exceed the threshold value.

6. The method according to claim 1, further comprising receiving by the self-return station a reason why the individual is trying to return the first item to the entity.

7. The method according to claim 6, further comprising performing operations by the self-return station to cause an advertisement, coupon, or replacement item information to be selected based on the reason.

8. The method according to claim 7, further comprising performing operations by the self-return station to present the advertisement, coupon, or replacement item information to the individual.

9. The method according to claim 1, further comprising:
receiving by the self-return station a user input for locating a second item in a facility;
detecting by the self-return station an image placed in proximity to the self-return station;
obtaining identification information from the image that identifies a second item that is associated with the image; and
using the identification information to determine a location of the second item within a facility or a location of a third item within the facility that is similar to the second item; and
causing the location to be presented to the individual.

10. A system, comprising:
a processor;
a non-transitory computer-readable storage medium comprising programming instructions that are configured to cause the processor to implement a method for returning items in a computing device, wherein the programming instructions comprise instructions to:
cause an image to be captured of a first item that an individual is trying to return to an entity;
performing machine learning operations using the image to determine whether the first item is damaged and to determine a degree of item damage;
causing a self-return station to allow a return of the first item to the entity when the first item is not damaged or when the degree of item damage does not exceed a threshold value; and
causing the self-return station to prevent the return of the first item to the entity when the first item is damaged and the degree of item damage exceeds the threshold value.

11. The system according to claim 10, wherein the programming instructions further comprise instructions to cause the self-return station to (1) allow the return of the first item to the entity and (2) quarantine the first item, when the first item is damaged and the degree of item damage does not exceed the threshold value.

12. The system according to claim 10, wherein the programming instructions further comprise instructions to:
obtain first information identifying the individual or second information identifying a customer account associated with the individual; and
use the first or second information to access third information specifying at least one of a total number of returned items for a given time period and a total dollar amount for the returned items.

13. The system according to claim 12, wherein the programming instructions further comprise instructions to reject the return of the first item to the entity when the total number of returned items or the total dollar amount exceeds a threshold value.

14. The system according to claim 13, wherein the programming instructions further comprise instructions to accept the return of the first item to the entity when the total number of returned items or the total dollar amount does not exceed the threshold value.

15. The system according to claim 10, wherein the programming instructions further comprise instructions to receive a reason why the individual is trying to return the first item to the entity.

16. The system according to claim 15, wherein the programming instructions further comprise instructions to select an advertisement, coupon, or replacement item information to be based on the reason.

17. The system according to claim 16, wherein the programming instructions further comprise instructions to present the advertisement, coupon, or replacement item information to the individual.

18. The system according to claim 10, wherein the programming instructions further comprise instructions to:
receive a user input for locating a second item in a facility;
detect an image placed in proximity to the self-return station;
obtain identification information from the image that identifies a second item that is associated with the image; and
use the identification information to determine a location of the second item within a facility or a location of a third item within the facility that is similar to the second item; and
cause the location to be presented to the individual.

* * * * *